US007965343B2

(12) United States Patent
Takeshita

(10) Patent No.: US 7,965,343 B2
(45) Date of Patent: Jun. 21, 2011

(54) REMOTE CONTROLLER

(75) Inventor: Masahiro Takeshita, Osaka (JP)

(73) Assignee: Funai Electric Co., Ltd., Daito-shi, Osaka (JP)

( * ) Notice: Subject to any disclaimer, the term of this patent is extended or adjusted under 35 U.S.C. 154(b) by 1209 days.

(21) Appl. No.: 11/646,908

(22) Filed: Dec. 28, 2006

(65) Prior Publication Data

US 2007/0146160 A1 Jun. 28, 2007

(30) Foreign Application Priority Data

Dec. 28, 2005 (JP) ................................ 2005-379211

(51) Int. Cl.
*H04N 5/44* (2006.01)

(52) U.S. Cl. .................................. 348/734; 340/825.72

(58) Field of Classification Search .................. 348/734, 348/725; 340/825.69, 825.71, 825.72, 539.1, 340/5.64; 725/37, 59; *H04N 5/44*
See application file for complete search history.

(56) References Cited

U.S. PATENT DOCUMENTS 5,715,020 A * 2/1998 Kuroiwa et al. .............. 348/734
2007/0140697 A1* 6/2007 Miyake et al. ................ 348/734

FOREIGN PATENT DOCUMENTS

JP 5-49076 2/1993
JP 6-335064 12/1994
JP 9-23487 1/1997

OTHER PUBLICATIONS

Patent Abstracts of Japan, Publication No. 09-023487, Publication Date: Jan. 21, 1997, 1 page.
Patent Abstracts of Japan, Publication No. 06-335064, Publication Date: Dec. 2, 1994, 1 page.
Patent Abstracts of Japan, Publication No. 05-049076, Publication Date: Feb. 26, 1993, 1 page.

* cited by examiner

*Primary Examiner* — Sherrie Hsia
(74) *Attorney, Agent, or Firm* — Osha • Liang LLP

(57) ABSTRACT

A remote controller allowing a user to change settings is provided. The remote controller includes a touch panel, a control circuit, a screen display memory, a setting data memory, a control data memory, an infrared transmission unit, and a battery. The control circuit includes a screen-display control circuit for displaying an image provided in advance for controlling the operation of a specific apparatus, a pressed-area detection circuit for detecting pressing in the display area of touch panel, an instructed-operation detection circuit for detecting the instruction of an operation, a display-data generation circuit for generating image data for displaying icons in the display area of touch panel, and a control-signal generation circuit for generating a signal for controlling the operation of the apparatus.

20 Claims, 23 Drawing Sheets

FIG.4

342

410 420

| APPARATUS'S NAME | APPARATUS-ICON DISPLAY DATA |
|---|---|
| TELEVISION | television.jpg |
| HDD | HDD. jpg |
| AIR CONDITIONER | air-conditioner.jpg |
| CEILING LIGHT | ceiling-light.jpg |

FIG.6

346

610 612 614

| ICON | TELEVISION CONTROL DATA |
| --- | --- |
| NUMBER "1" | CHANNEL 1 |
| NUMBER "2" | CHANNEL 2 |
| ... | ... |
| SOUND VOLUME UP | SOUND VOLUME UP |
| SOUND VOLUME DOWN | SOUND VOLUME DOWN |
| CHANNEL UP | SELECT CHANNEL UPWARD |
| CHANNEL DOWN | SELECT CHANNEL DOWNWARD |
| EXTERNAL INPUT | ACCEPT INPUT OF EXTERNAL SIGNAL |
| POWER | TURN POWER ON/OFF |

620 622 624

| ICON | HDD RECORDER CONTROL DATA |
| --- | --- |
| NUMBER "1" | CHANNEL 1 |
| NUMBER "2" | CHANNEL 2 |
| ... | ... |
| PLAYBACK | START PLAYBACK |
| RECORDING | START RECORDING |
| STOP | STOP RECORDING/ PLAYBACK |
| RECORDING MODE | CHANGE RECORDING MODE (STANDARD⇒HIGH QUALITY⇒LONG TIME⇒STANDARD) |
| CHANNEL UP | SELECT CHANNEL UPWARD |
| CHANNEL DOWN | SELECT CHANNEL DOWNWARD |
| POWER | TURN POWER ON/OFF |

630 632 634

| ICON | AIR CONDITIONER CONTROL DATA |
| --- | --- |
| UP | SOUND VOLUME UP |
| DOWN | SOUND VOLUME DOWN |
| OPERATION MODE | CHANGE OPERATION MODE (FAN⇒COOLING⇒HEATING⇒FAN) |
| WIND VOLUME | CHANGE WIND VOLUME (STANDARD⇒SLIGHT WIND⇒STRONG WIND⇒STANDARD) |
| TIMER | SETTING ON TIMER OPERATION START/END |
| POWER | TURN POWER ON/OFF |

640 642 644

| ICON | CEILING LIGHT CONTROL DATA |
| --- | --- |
| POWER | TURN ON/OFF LIGHT |
| UP | LIGHT INTENSITY UP |
| DOWN | LIGHT INTENSITY DOWN |
| TIMER | SETTING ON TIMER LIGHT OUT |

FIG.10

344

1010 1020 1030

| No. | APPARATUS'S NAME | OPERATED ICON |
|---|---|---|
| 01 | TELEVISION | TV POWER ON |
| 02 | TELEVISION | TV EXTERNAL INPUT |
| 03 | HDD RECORDER | HDD RECORDER POWER ON |
| 04 | HDD RECORDER | HDD RECORDER PLAYBACK |
| 05 | CEILING LIGHT | CEILING LIGHT INTENSITY DOWN |
| 06 | TELEVISION | TV SOUND VOLUME UP |
| 07 | HDD RECORDER | HDD RECORDER STOP |
| 08 | HDD RECORDER | HDD RECORDER POWER OFF |
| 09 | TELEVISION | TV POWER OFF |
| 10 | CEILING LIGHT | CEILING LIGHT POWER OFF |

FIG.13

344

1310 1320

| ICON | DISPLAY POSITION |
|---|---|
| NUMBER "1" | (120,100) |
| NUMBER "2" | (240,100) |
| NUMBER "3" | (360,100) |
| NUMBER "4" | (120,200) |
| ... | ... |

FIG.16

344

| No. (1610) | APPARATUS NAME (1620) | OPERATED ICON (1630) | NUMBER OF TIMES (1640) |
|---|---|---|---|
| 1 | TELEVISION | CHANNEL 2 | 10 |
| 2 | TELEVISION | CHANNEL 4 | 50 |
| 3 | TELEVISION | EXTERNAL INPUT | 200 |
| ... | ... | ... | ... |
| 11 | HDD | PLAYBACK | 100 |
| 12 | HDD | STOP | 100 |
| 13 | HDD | POWER ON | 200 |
| ... | ... | ... | ... |
| 21 | AIR CONDITIONER | OPERATION MODE | 10 |
| 22 | AIR CONDITIONER | POWER | 100 |
| ... | ... | ... | ... |
| 23 | CEILING LIGHT | POWER | 100 |
| 24 | CEILING LIGHT | DOWN | 10 |
| ... | ... | ... | ... |

FIG.19

344

1920 (1992, 1924, 1926)

| SCREEN | APPARATUS NAME | OPERATED ICON |
|---|---|---|
| 2 | TELEVISION | TV CH 4 |
| 2 | HDD RECORDER | RECORDING |

1910 (1912, 1914, 1916)

| SCREEN | APPARATUS NAME | OPERATED ICON |
|---|---|---|
| 1 | TELEVISION | POWER (ON) |
| 1 | TELEVISION | EXTERNAL INPUT |
| 1 | HDD RECORDER | POWER (ON) |
| 1 | HDD RECORDER | PLAYBACK |
| 1 | CEILING LIGHT | (LIGHT INTENSITY) DOWN |
| 1 | TELEVISION | SOUND VOLUME UP |
| 1 | HDD RECORDER | STOP |
| 1 | HDD RECORDER | POWER (OFF) |
| 1 | TELEVISION | POWER (OFF) |
| 1 | CEILING LIGHT | POWER (OFF) |

REMOTE CONTROLLER

BACKGROUND OF THE INVENTION

1. Field of the Invention

The present invention relates to a remote controller, and more specifically to a remote controller capable of controlling a plurality of apparatuses.

2. Description of the Background Art

A remote controller generally functions as a device for controlling a specific apparatus. The keys and the other operation units provided with the remote controller accept an operation input for giving a specific instruction to that apparatus. Accordingly, some of the operation units not used by some users of the remote controller at all may be contained in the remote controller without change, and thus the remote controller has not always been user-friendly to some of the users.

For example, Japanese Patent Laying-Open No. 09-023487 has disclosed a remote controller which can identify a user, learn the use frequency of each function for each identified user, and change display patterns in accordance with the learning result. Japanese Patent Laying-Open No. 06-335064 has disclosed a remote controller capable of reducing operation complexity. Japanese Patent Laying-Open No. 05-049076 has disclosed a remote controller which allows users to handle additional functions having high frequencies as easily as the basic functions.

However, in the remote controller disclosed in Japanese Patent Laying-Open No. 09-023487, there has been a problem in that the display patterns cannot be changed until the learning is carried out. According to the technique disclosed in Japanese Patent Laying-Open No. 06-335064, a user might operate mistakenly, because buttons having low frequencies remain on the remote controller body. Also, according to the remote controller disclosed in Japanese Patent Laying-Open No. 05-049076, when the number of functions having about the same frequencies exceeds the number of keys provided in advance, a function having a high frequency might not be assigned to a large-sized key.

SUMMARY OF THE INVENTION

The present invention has been made in order to solve the above-described problems. An object is to provide a remote controller which is easy for a user to operate before the learning is carried out.

Another object of the present invention is to provide a remote controller capable of preventing operation errors by a user.

Still another object of the present invention is to provide a remote controller capable of assigning a key having a size in accordance with the frequency of the function to that function.

In summary, in order to achieve the above-described objects, according to an aspect of this invention, there is provided a remote controller including: an operation unit displaying an image in a display area and accepting an operation on the image; a first storage unit storing each identification data for identifying each of a plurality of apparatuses, each control data for executing each of a plurality of predefined operations for each of a plurality of the apparatuses, and each image data representing an image identifying each of the operations a first display control unit displaying a plurality of images in the display area on the basis of an operation on the operation unit and each of the image data; a change unit changing the image displayed in the display area on the basis of the operation for the operation unit; a second storage unit storing change data indicating the target of the change on the image having been changed; a second display control unit displaying the image having been changed in the display area on the basis of the change data; a generation unit generating a control signal for instructing execution of the operation corresponding to the image having received the operation on the basis of the operation on the image displayed in the display area and having been changed using the control data corresponding to the image having received the operation; and a transmission unit transmitting the control signal.

According to another aspect of this invention, there is provided a remote controller including: an operation unit displaying an image in a display area and accepting an operation on the image; a memory storing each identification data for identifying each of a plurality of apparatuses, each control data for executing a plurality of predefined operations for each of a plurality of the apparatuses, each image data representing an image identifying each of the operations, and an instruction sequence; and a processor executing the instruction sequence, wherein the instruction sequence includes a first display control step of displaying a plurality of images in the display area on the basis of an operation on the operation unit and each of the image data, a change step of changing the image displayed in the display area on the basis of the operation on the operation unit, a step of generating change data indicating the target of the change on the image having the change, a second display control step of displaying an image having the change in the display area, a generation step of generating a control signal for instructing execution of the operation corresponding to the image having received the operation on the basis of the operation on the image having the change displayed in the display area using the control data corresponding to the image having received the operation; and a step of instructing transmission of the control signal.

The remote controller according to the present invention makes it possible for a user to easily operate the remote controller before the learning is carried out. Also, it is possible to prevent operation errors by a user. Further, it is possible to assign a key having a size in accordance with the frequency of the function to that function, and thus it becomes convenient for the user.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 4 is a diagram illustrating a form of data storage in a screen-display memory of the remote controller.

FIG. 6 is a diagram illustrating a form of control data storage in a control-data memory of the remote controller.

FIG. 10 is a diagram illustrating a form of data storage in a setting-data memory of the remote controller.

FIG. 13 is a diagram illustrating a form of data storage in the setting-data memory.

FIG. 16 is a diagram illustrating a form of operation history storage in the setting-data memory.

FIG. 19 is a diagram illustrating a form of data storage in the setting-data memory of a remote controller according to a second modification of the embodiment of the present invention.

DESCRIPTION OF THE PREFERRED EMBODIMENTS

Figure 1:
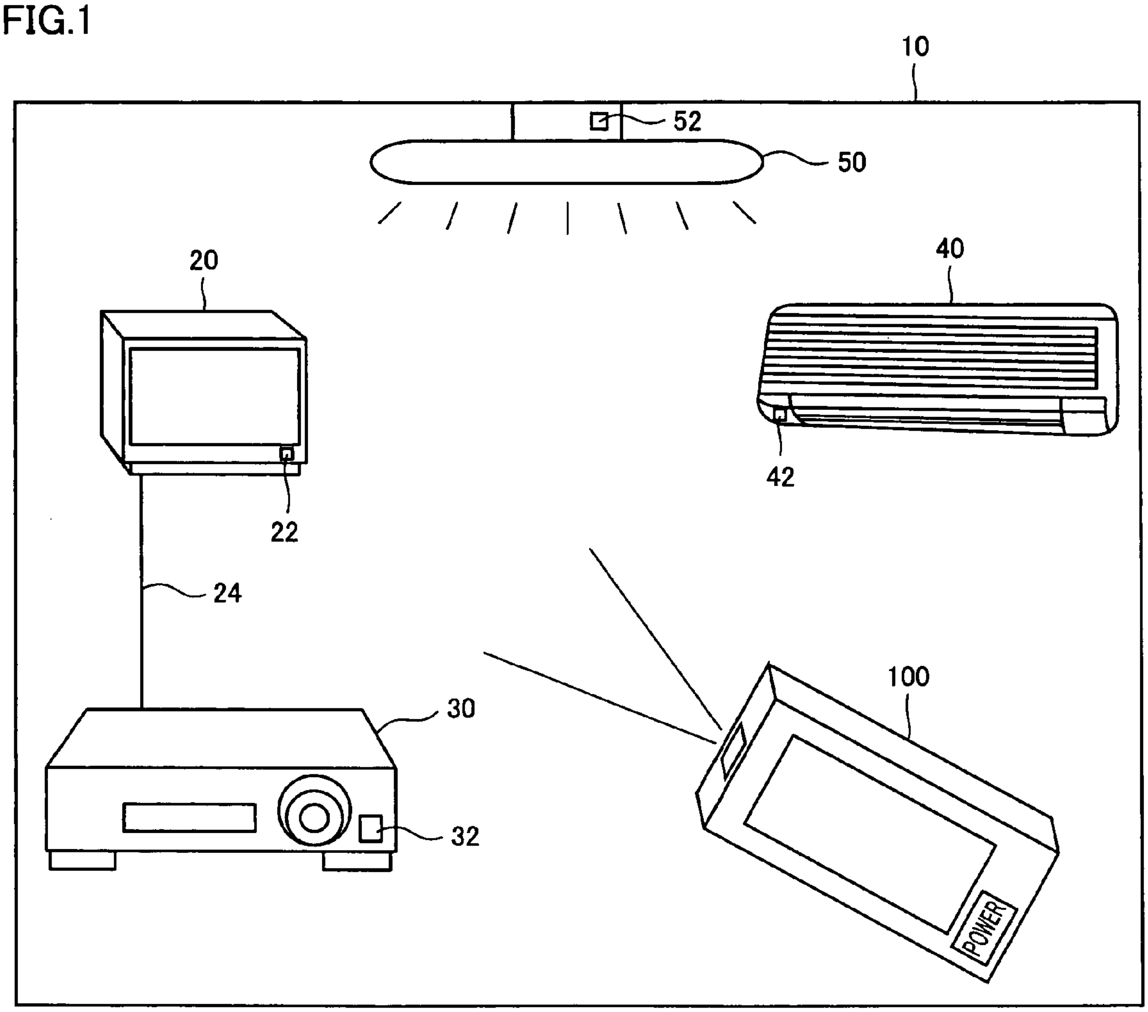
FIG. 1 is a view illustrating a room in which apparatuses controlled by a remote controller according to an embodiment of the present invention are disposed.

In the following, a description will be given of an embodiment of the present invention with reference to the drawings. In the following description, the same parts are denoted with the same reference numerals, and their names and functions are the same. Accordingly, the detailed description on them will not be repeated.

With reference to FIG. 1, a description will be given of a use mode of a remote controller 100 according to the present invention. FIG. 1 is a view illustrating a room 10 in which apparatuses controlled by remote controller 100 according to an embodiment of the present invention are disposed. A television 20, a hard disk recorder 30 connected to television 20 through a cable 24, an air conditioner 40, and a ceiling light 50 attached to the ceiling of room 10 are disposed in room 10. Television 20 includes a light receiving unit 22 for receiving a remote controller signal. Hard disk recorder 30 includes a light receiving unit 32 for receiving a remote controller signal. Air conditioner 40 includes a light receiving unit 42 for receiving a remote controller signal. Ceiling light 50 includes a light receiving unit 52 for receiving a remote controller signal.

As described below, remote controller 100 stores each control data for executing each of a plurality of operations predefined for each of a plurality of the apparatuses. Remote controller 100 generates and transmits a remote controller signal on the basis of each control data. Television 20, hard disk recorder 30, air conditioner 40, and ceiling light 50 receive the control signal transmitted by remote controller 100, and executes the predefined operation on the basis of the control data included in the signal.

Figure 2:
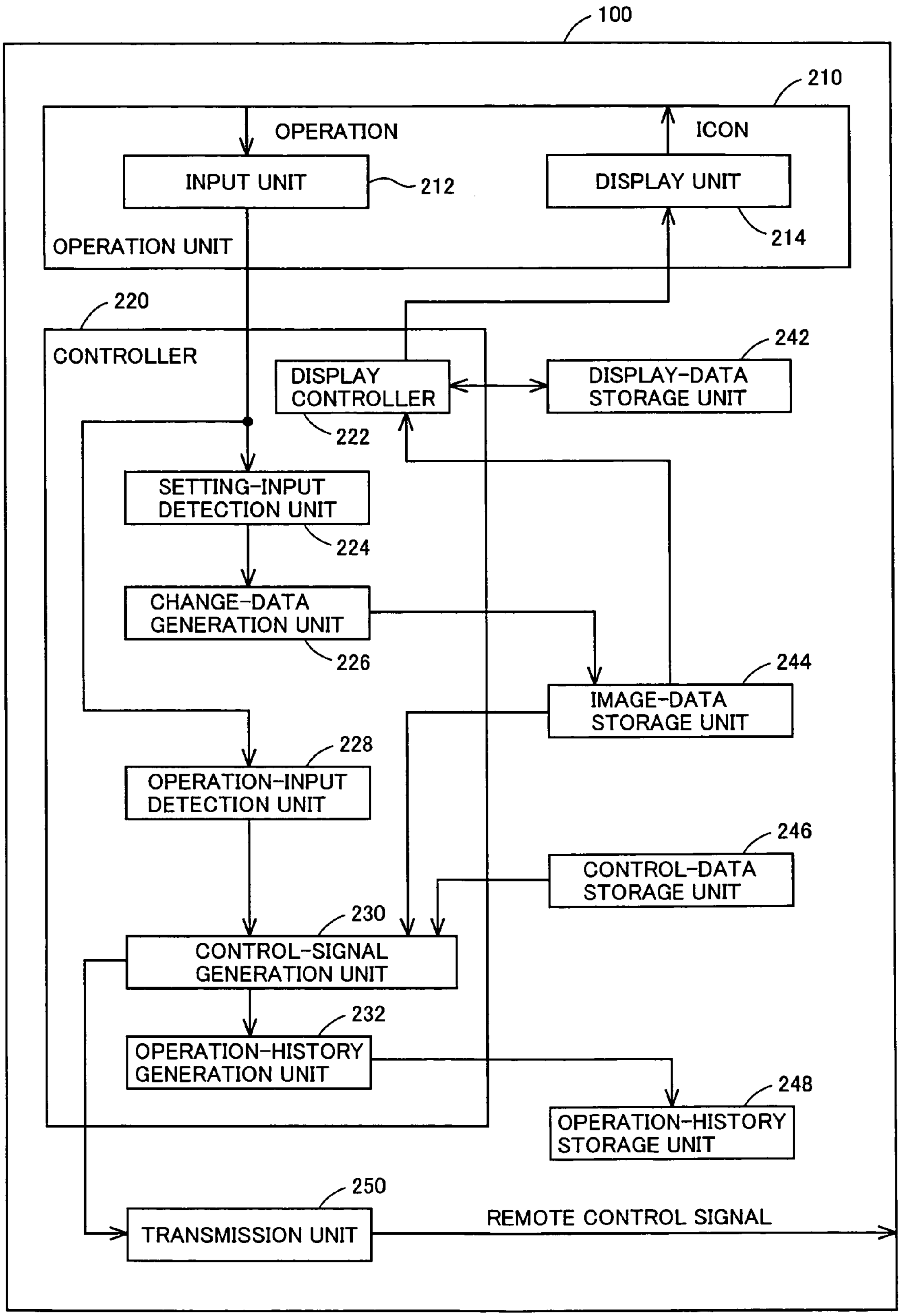
FIG. 2 is a block diagram illustrating the configuration of functions implemented by the remote controller.

With reference to FIG. 2, a description will be given of the configuration of remote controller 100. FIG. 2 is a block diagram illustrating the configuration of functions implemented by remote controller 100. Remote controller 100 includes an operation unit 210, a controller 220, a display-data storage unit 242, an image-data storage unit 244, a control-data storage unit 246, an operation-history storage unit 248, and a transmission unit 250. Operation unit 210 includes a display unit 214 which displays an image in a display area and an input unit 212 which accepts an operation on the image displayed in the display area.

Display-data storage unit 242 stores the image data corresponding to an image displayed in display unit 214. Image-data storage unit 244 stores the image data input from the outside in advance or the image data generated by controller 220. Control-data storage unit 246 stores each control data for executing each of a plurality of the defined operations for each of a plurality of apparatuses provided in advance. Operation-history storage unit 248 stores the history of operations on input unit 212.

Controller 220 includes a display controller 222, a setting-input detection unit 224, an change-data generation unit 226, an operation-input detection unit 228, a control-signal generation unit 230, and an operation-history generation unit 232. Display controller 222 controls the display of an image in display unit 214 on the basis of the data stored in display-data storage unit 242. Setting-input detection unit 224 detects the input of data for setting an image to be displayed in display unit 214 on the basis of the operation in input unit 212. Change-data generation unit 226 generates data for changing an image to be displayed in display unit 214 on the basis of the input data detected by setting-input detection unit 224 and the image data for displaying the image stored in image-data storage unit 244. Specifically, change-data generation unit 226 detects the selection of the image displayed in the display area on the basis of the operation in input unit 212, and accepts the input of the position data for determining the position, in the display area, of the image whose selection has been detected.

Operation-input detection unit 228 detects that an operation has been input into an apparatus defined by an image displayed in display unit 214 on the basis of the operation on input unit 212. Control-signal generation unit 230 generates a control signal for controlling the operation of the apparatus on the basis of the operation input detected by operation-input detection unit 228, the image data stored in image-data storage unit 244, and the control data corresponding to that operation stored in control-data storage unit 246. Operation-history generation unit 232 generates an operation history of operation input to input unit 212 in response to the generation of control signal by control-signal generation unit 230. The operation history includes, for example, the number of times of the operations or the sequence of the input operations. Operation-history generation unit 232 stores the generated operation history in the area reserved in advance in operation-history storage unit 248.

Transmission unit 250 transmits the control signal generated by control-signal generation unit 230. Preferably, transmission unit 250 transmits the control signal as, for example, an infrared signal.

Figure 3:
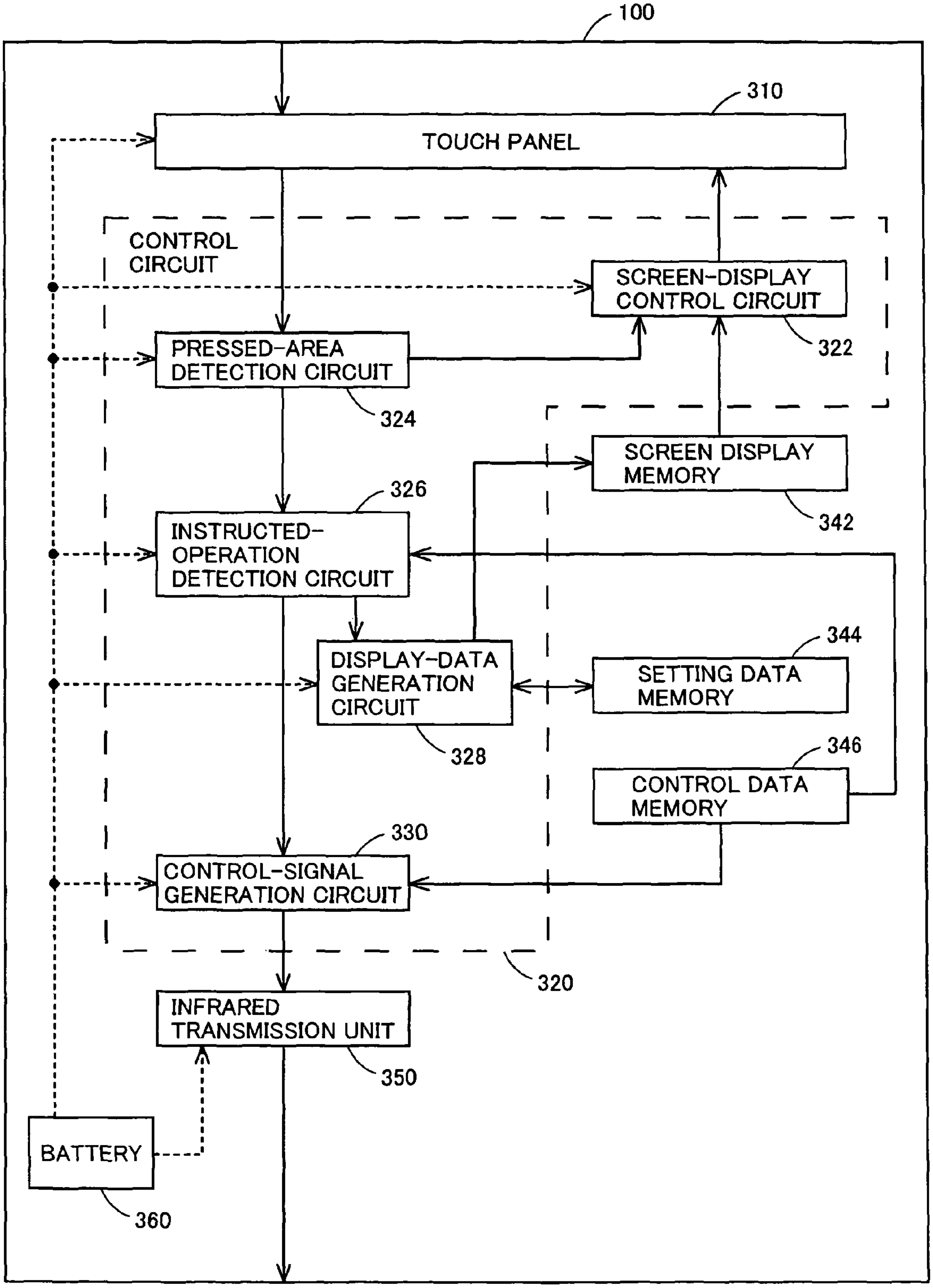
FIG. 3 is a block diagram illustrating the hardware configuration of the remote controller.

With reference to FIG. 3, a description will be given of the specific configuration of the remote controller 100. FIG. 3 is a block diagram illustrating the hardware configuration of remote controller 100. Remote controller 100 includes, as major components, a touch panel 310, a control circuit 320, a screen display memory 342, a setting data memory 344, a control data memory 346, an infrared transmission unit 350, and a battery 360. Control circuit 320 includes a screen-display control circuit 322, a pressed-area detection circuit 324, an instructed-operation detection circuit 326, a display-data generation circuit 328, and a control-signal generation circuit 330. Each of the components is connected with signal lines.

Touch panel 310 displays an image in the display area, accepts an operation on that image, and outputs the signal corresponding to the operation. Touch panel 310 is, for example, a pressure-sensitive panel or an electrostatic panel. A pressure-sensitive panel detects a change of pressure in the display area. An electrostatic panel detects a change of an electronic signal by static electricity in the display area. In this regard, the detailed structure of a touch panel is easy to understand for those skilled in the art, and thus the description thereof will not be given here.

Screen-display control circuit 322 controls the display of images in touch panel 310 on the basis of the data stored in screen display memory 342 and the signal output from pressed-area detection circuit 324. Screen-display control circuit 322 displays, for example a list of apparatuses capable of being controlled by remote controller 100. Alternatively, screen-display control circuit 322 displays images (so-called icons) provided in advance for controlling the operation of a specific apparatus. When any one of the images is pressed, remote controller 100 generates and transmits a control signal for instructing the operation corresponding to the image as described below.

Pressed-area detection circuit 324 detects the pressing on the display area of touch panel 310. Specifically, pressed-area detection circuit 324 detects a change in pressure in the display area or a change in electronic signal, and identifies the image corresponding to the area whose change has been detected.

Instructed-operation detection circuit 326 detects that an operation for a specific apparatus has been instructed on the basis of the image data corresponding to the area detected by pressed-area detection circuit 324. Specifically, instructed-operation detection circuit 326 detects an input of an instruction to the apparatus corresponding to that position on the basis of the position operated on touch panel 310. For example, if the user has touched the image corresponding to the instruction to turn on the power on touch panel 310, instructed-operation detection circuit 326 detects that the instruction of turning on the power has been input. The signal of the detection result is sent to control-signal generation circuit 330.

Also, when the operation mode of remote controller 100 is a mode in which the icons displayed on touch panel 310 are determined, instructed-operation detection circuit 326 detects the selection of the icon touched by the user on touch panel 310. The signal indicating that the icon is selected is sent to display-data generation circuit 328.

Display-data generation circuit 328 generates image data for displaying icons in the display area of touch panel 310 on the basis of the signal from instructed-operation detection circuit 326. Preferably, display-data generation circuit 328 generates data for displaying the size of the icon to be displayed on touch panel 310 in accordance with the size selected by the user. Also, in another aspect, display-data generation circuit 328 changes the size in accordance with the usage history of the operation content corresponding to that icon. The usage history includes the number of times of the operation content, the sequence of the use, etc. Display-data generation circuit 328 may change the size of the icon by the combination of the selection by the user and the usage history.

For example, display-data generation circuit 328 generates the data for displaying the image which has accepted the number of the operations exceeding a preset number in a larger size than the image corresponding to the other operations. Alternatively, display-data generation circuit 328 calculates the order of the operation history for each image, generates the data for displaying the image having an order included in a preset order in a larger size than the image not included in that order.

Alternatively, display-data generation circuit 328 changes the positions of a plurality of the images displayed in the display area on the basis of the operation on touch panel 310. Preferably, display-data generation circuit 328 changes the position data defining the display position of each icon on the basis of the data for identifying each of the positions of a plurality of images input through touch panel 310. Also, display-data generation circuit 328 changes the above-described position data on the basis of the operation history on touch panel 310. Preferably, display-data generation circuit 328 changes the position data of a first image having the number of the accepted operations exceeding a preset number of times such that the first image is displayed in an upper position on touch panel 310 than the position of a second image having the number of accepted operations falling below that number of times. Display-data generation circuit 328 calculates the order of the operation history for each image, and generates data so that a screen on which an image whose order is included in a preset order and a screen on which an image whose order is not included in that preset order are changed. Also, display-data generation circuit 328 generates data for displaying, on touch panel 310, only the image whose order is included in the preset order. More preferably, display-data generation circuit 328 generates the display data such that the image whose position is not included in the preset order is not displayed. That is to say, display-data generation circuit 328 does not refer to the image data of the icons which are not to be displayed on touch panel 310, but refers to only the image data of the other icons to generate the display data. When the display processing on touch panel 310 is performed on the basis of the above-described data, only specific icons are displayed.

Control-signal generation circuit 330 generates a signal for controlling the operation of the apparatus on the basis of the signal and the predefined control data stored in control data memory 346. Control-signal generation circuit 330 generates, for example, a signal which has the data identifying the apparatus instructed to be operated and the data indicating the instructed operation. The control signal generated by control-signal generation circuit 330 is sent to the infrared transmission unit 350. Infrared transmission unit 350 emits light to the outside in order to transmit the signal as infrared light. Battery 360 supplies power individually to the main components of remote controller 100.

With reference to FIG. 4, a description will be given of the data structure of the remote controller 100. FIG. 4 is a diagram illustrating a form of a data store in screen-display memory 342. Screen-display memory 342 includes areas 410 and 420 for storing data. Area 410 stores the data (an apparatus's name, a product number, etc.) for identifying the apparatuses that can be controlled by remote controller 100. Area 420 stores icon display data for displaying the apparatuses as images. The data stored in area 410 and the data stored in area 420 are related individually.

Figure 5:
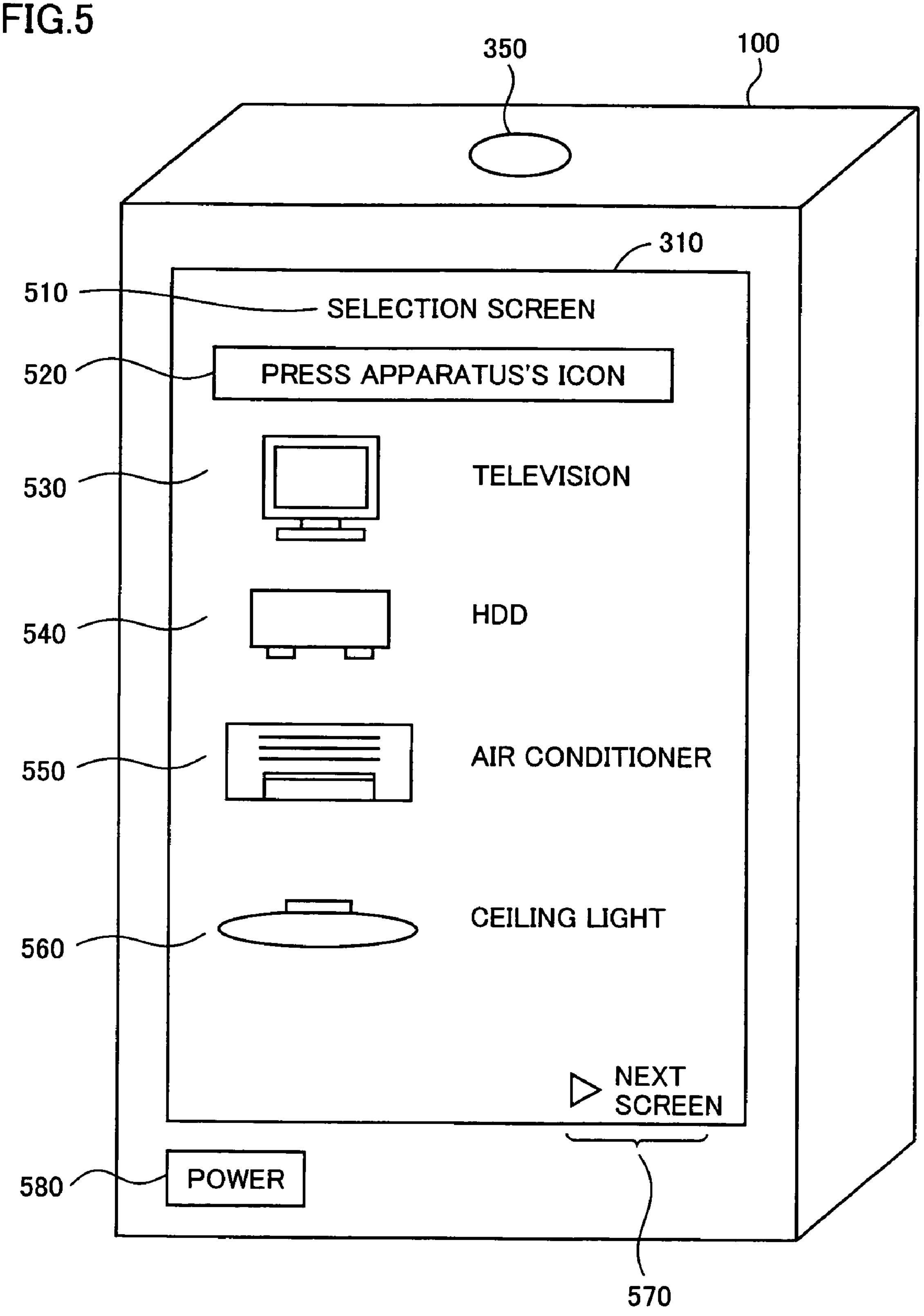
FIG. 5 is a diagram illustrating an apparatus selection screen on a touch panel of the remote controller.

With reference to FIG. 5, a description will be given of the display mode of remote controller 100. FIG. 5 is a diagram illustrating an apparatus selection screen on touch panel 310. Remote controller 100 includes a power switch 580 in addition to the configuration shown in FIG. 3. Touch panel 310 displays the images corresponding to the apparatuses in the display area.

Specifically, as shown in FIG. 5, touch panel 310 displays a title 510 of the displayed screen, a message 520, an image 530 corresponding to television 20, an image 540 corresponding to hard disk recorder 30, an image 550 corresponding to air conditioner 40, an image 560 representing ceiling light 50, an image 570 accepting input of the instruction for changing the displayed screen to the next screen. Images 530 to 560 are implemented, for example, by the data (areas 410 and 420 in FIG. 4) stored in screen-display memory 342. The screen shown in FIG. 5 is displayed when a user presses power switch 580 of remote controller 100.

With reference to FIG. 6, a further description will be given of the data structure of remote controller 100. FIG. 6 is a diagram illustrating a form of the control data store in control-data memory 346. Control-data memory 346 includes tables 610 to 640 having the data for defining the operations for each apparatus. Table 610 includes data 612 representing icons displayed in the display area of touch panel 310, and control data 614 for controlling television 20 corresponding to each of the icons. The data stored in area 612 and the data stored in area 614 are related one another. For example, when the icon is "1", the control data thereof is the data for instructing the selection of Channel 1. Similarly, the icon indicating "Up" is related to the control data for increasing the sound volume of television 20.

Similarly, table 620 for controlling hard disk recorder 30 includes areas 622 and 624 for storing data. Area 622 stores the data representing the icons to be displayed on touch panel 310. Area 624 stores the control data provided in advance for controlling hard disk recorder 30. The data stored in area 622 and the data stored in area 624 are related one another. For example, when the icon is "playback", the icon is related to the control data for starting hard disk recorder 30 to reproduce video.

A table 630 which stores data for controlling air conditioner 40 includes areas 632 and 634. Area 632 stores the data for representing icons. Area 634 stores the control data predefined for controlling air conditioner 40. The data stored in each of the areas is respectively related to each other. For example, the icon displayed as "operation mode" is related to the data for changing the operation mode of air conditioner 40 as the control data. In this case, if that icon is pressed, the control signal for air conditioner 40 is changed to the preset signal (that is to say, from "fan" to "cooling", and to "heating") in sequence, and then is returned to the signal corresponding to "fan" once again.

A table 640 which stores data for controlling ceiling light 50 includes areas 642 and 644. Area 642 stores the data for representing icons. Area 644 stores the control data for controlling ceiling light 50. The data stores in each of the areas is individually related to each other. For example, the icon displayed as "Up" is related to the data for increasing the intensity of ceiling light 50. If this icon is pressed, remote controller 100 transmits the control signal having the data for identifying ceiling light 50 and the instruction for increasing the light intensity.

Figure 7:
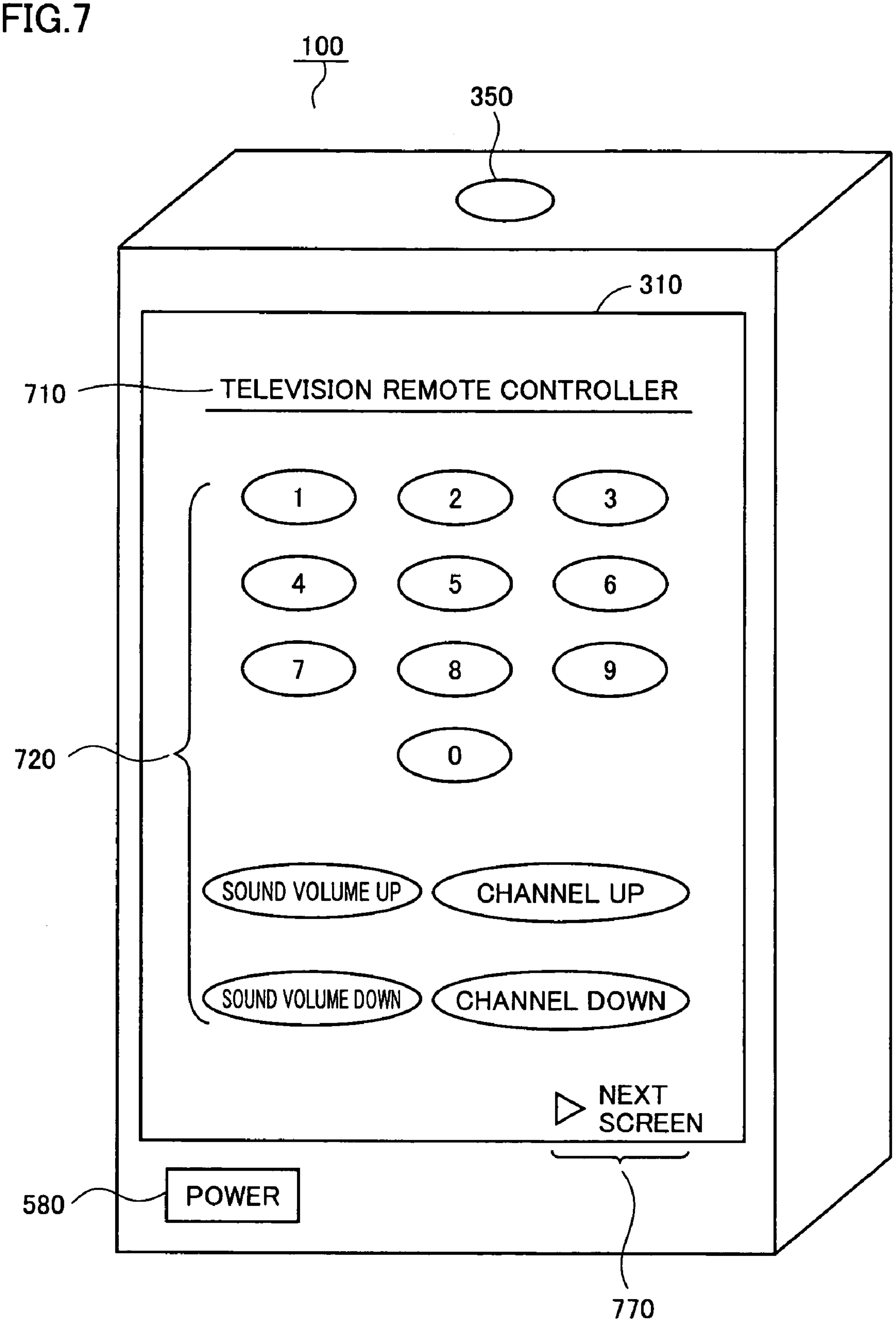
FIG. 7 is a diagram illustrating a screen displayed on the touch panel of the remote controller controlling a television.

With reference to FIG. 7, a further description will be given of the data structure of remote controller 100. FIG. 7 is a diagram illustrating a screen displayed on touch panel 310 when remote controller 100 functions as a remote controller for controlling television 20. This display is achieved, for example, on the basis of the data of table 610 shown in FIG. 6. That is to say, touch panel 310 displays a message 710 indicating that remote controller 100 functions as a remote controller for controlling television 20, individual icons 720 displayed on the basis of the data stored in area 612, and an image 770 for accepting the operation for changing the screen. The icons "1" to "0" accept the input of numbers for selecting channel of television 20. Similarly, each of the icons of the sound volume up or the sound volume down accepts the input of the instruction to turn up the volume or turn down the volume of television 20 individually. These inputs are converted to the control signal on the basis of the control data stored in area 614 as shown in FIG. 6.

Figure 8:
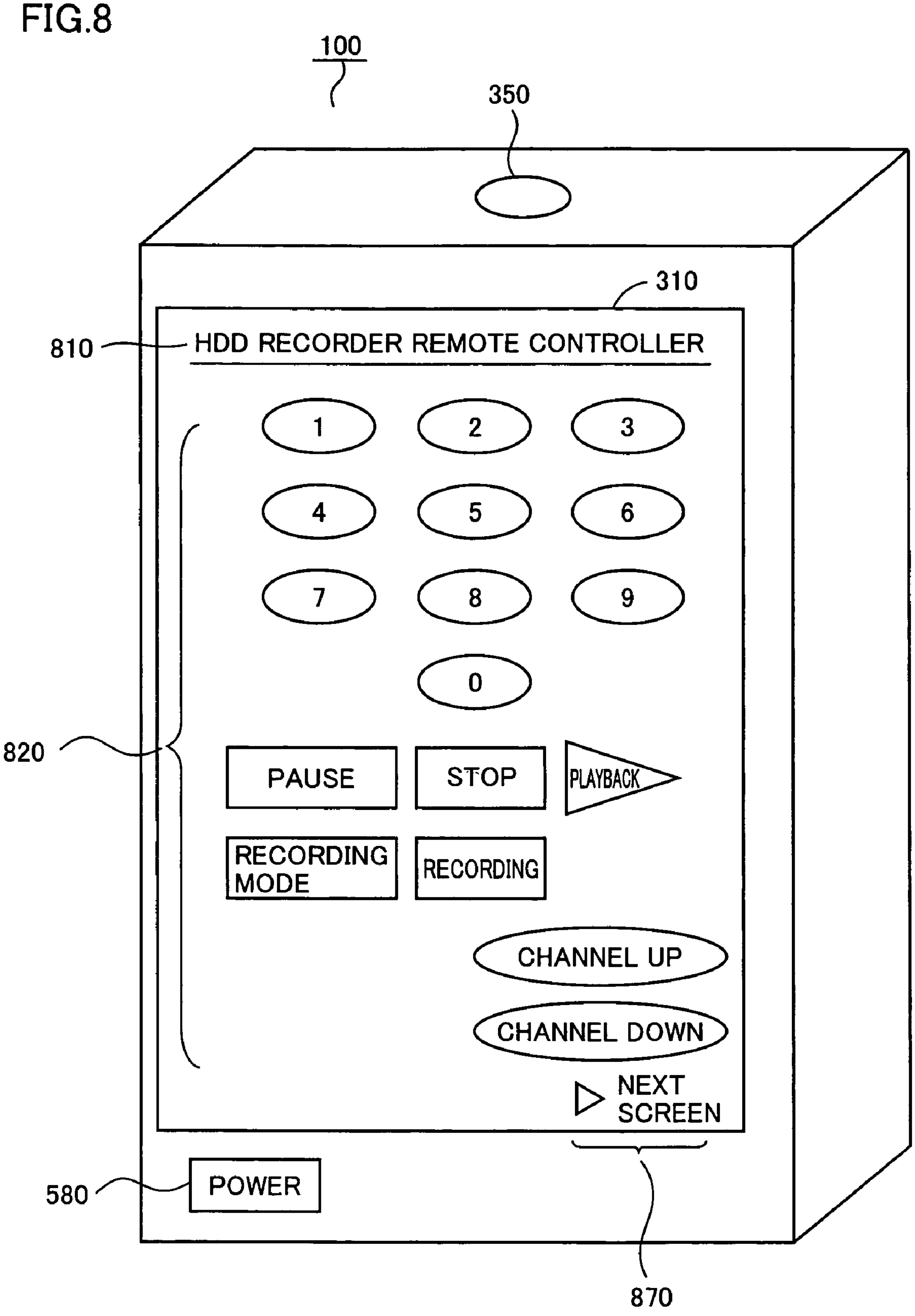
FIG. 8 is a diagram illustrating a screen of a remote controller controlling a hard disk recorder.

FIG. 8 is a diagram illustrating a screen of remote controller 100 for controlling hard disk recorder 30. This screen is displayed on touch panel 310 after the user has pressed image 540 on the screen shown in FIG. 5.

Touch panel 310 displays a message 810 indicating that remote controller 100 functions as a remote controller for controlling hard disk recorder 30, icons 820 for accepting the operations for instructing the operations of hard disk recorder 30, and an icon 870 for accepting the instruction for changing the display of the screen. Message 810 is displayed, for example on the basis of the data provided in advance in setting data memory 344. Message 810 is a message provided in advance, but may be changed by the user of remote controller 100 inputting a text.

Icons 820 are displayed on the basis of the data stored in area 622 of table 620. When the user presses the icon indicating "playback" for example on such a display, remote controller 100 generates a signal for starting the playback of video for hard disk recorder 30, and transmit the signal through infrared transmission unit 350.

Figure 9:
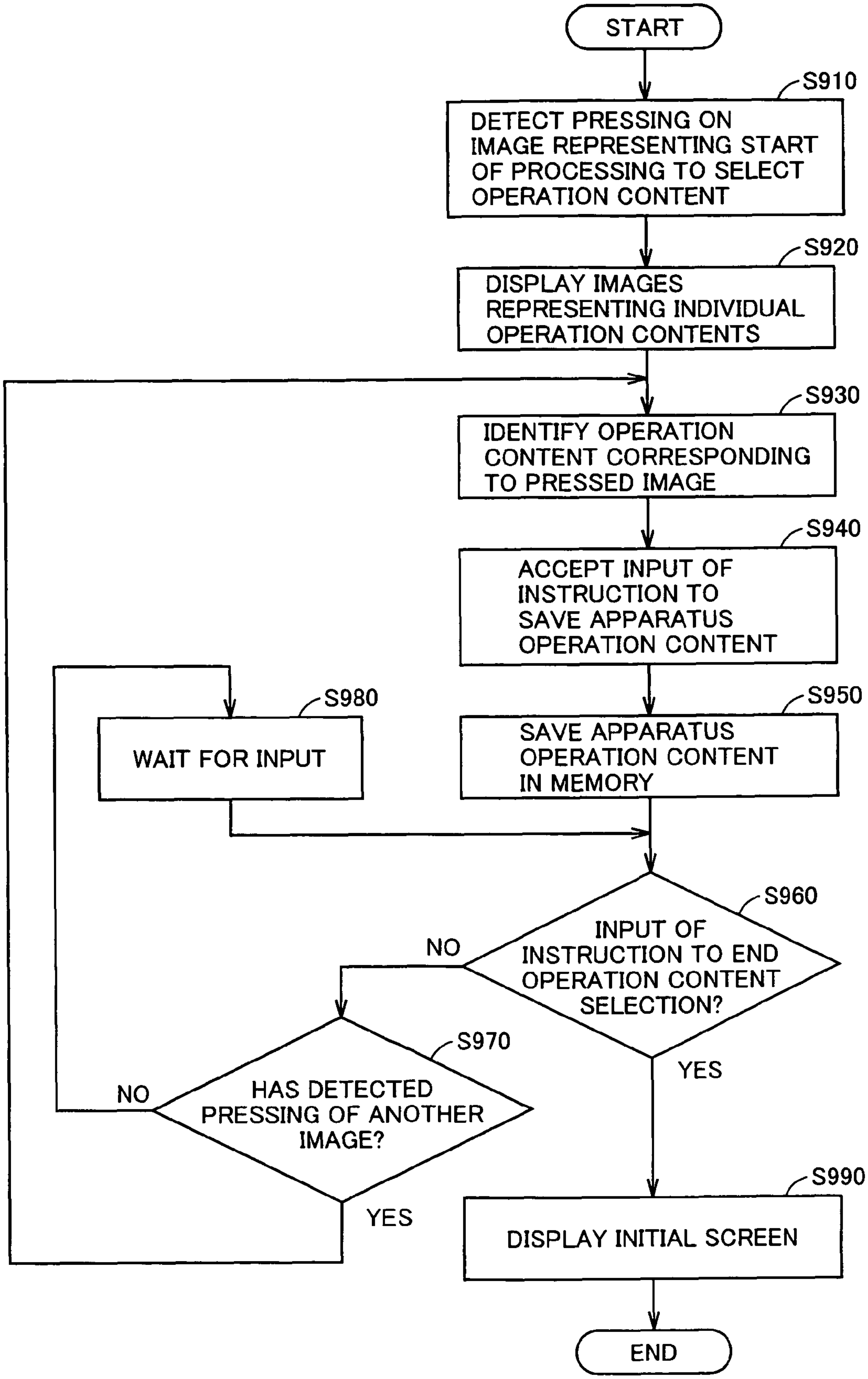
FIG. 9 is a flowchart illustrating a processing procedure executed by a control circuit for changing display patterns of icons of the remote controller.

With reference to FIG. 9, a description will be given of the control structure of the remote controller 100. FIG. 9 is a flowchart illustrating a processing procedure executed by control circuit 320 for changing display patterns of the icons of remote controller 100.

In step S910, pressed-area detection circuit 324 detects the pressing on the image representing the start of the processing for the user to select the operation content on the basis of the operation on touch panel 310. The detection signal is sent to instructed-operation detection unit 326. In step S920, screen-display control circuit 322 displays the image indicating each operation content of a plurality of operations for the apparatus to perform on the basis of the detection result by pressed-area detection circuit 324. The display is achieved as the screen shown in FIG. 7 or FIG. 8. At this time, in order to indicate that the pressing of icon at the time of selection of the icon after that time is not the input for a specific control, a flag may be set, in step S910 or in step S920, for indicating that the following processing is merely for the selection processing and that the processing is not for transmitting a control signal to a specific apparatus. By setting such a flag, even if an icon is pressed, the control signal is not transmitted, and thus an operation error by remote controller 100 is prevented.

In step S930, instructed-operation detection circuit 326 identifies the operation content corresponding to the pressed image on the basis of the pressing of an icon displayed in the display area. Specifically, instructed-operation detection circuit 326 identifies the operation content selected by the user on the basis of the position, in the display area, detected by pressed-area detection circuit 324 and the image displayed at that position. In step S940, instructed-operation detection circuit 326 accepts the input of the instruction to save the operation content of the apparatus corresponding to the selected image on the basis of the operation on touch panel 310. Display-data generation circuit 328 stores the operation content corresponding to the image selected by that instruction into the area reserved in advance in setting data memory 344. Furthermore, display-data generation circuit 328 identifies the position of the selected icon in the display area on the basis of the input of the position data through touch panel 310, and saves the position data in connection with the operation content saved before.

In step S960, instructed-operation detection circuit 326 determines whether the instruction has been input to end the selection of the operation content corresponding to the image displayed on touch panel 310 on the basis of the operation on touch panel 310. If instructed-operation detection circuit 326 determines that such an instruction has been input (YES in step S960), the control proceeds to step S990. Otherwise (NO in step S960), the control proceeds to step S970.

In step S970, instructed-operation detection circuit 326 determines whether another image has been pressed on touch panel 310 on the basis of the detection result by pressed-area detection circuit 324. If instructed-operation detection circuit 326 determines that another image has been pressed (YES in step S970), the control returns to step S930. Otherwise (NO in step S970), the control proceeds to step S980.

In step S980, control circuit 320 waits for input on touch panel 310. Next, the control proceeds to step S960. In step 990, screen-display control circuit 322 displays the initial screen in the display area on the basis of the data for displaying an initial screen stored in screen display memory 342. In this manner, image selection in remote controller 100 is achieved.

With reference to FIG. 10, a description will be given of the data structure of remote controller 100 after the user changed the settings. FIG. 10 is a diagram illustrating a form of data storage in setting-data memory 344. Setting-data memory 344 includes areas 1010 to 1030 for storing data.

The data for identifying the data record generated by the setting of the user is stored in an area 1010. The data for identifying the apparatus selected by the user (for example, the apparatus's name) is stored in an area 1020. The image selected by the user, that is to say, the icon selected as a target of operation is stored in an area 1030. The data stored in the areas 1010 to 1030 is mutually related. Accordingly, a specific icon is determined by specifying the data stored in area 1010. When an icon is determined, the icon can be displayed on touch panel 310.

Figure 11:
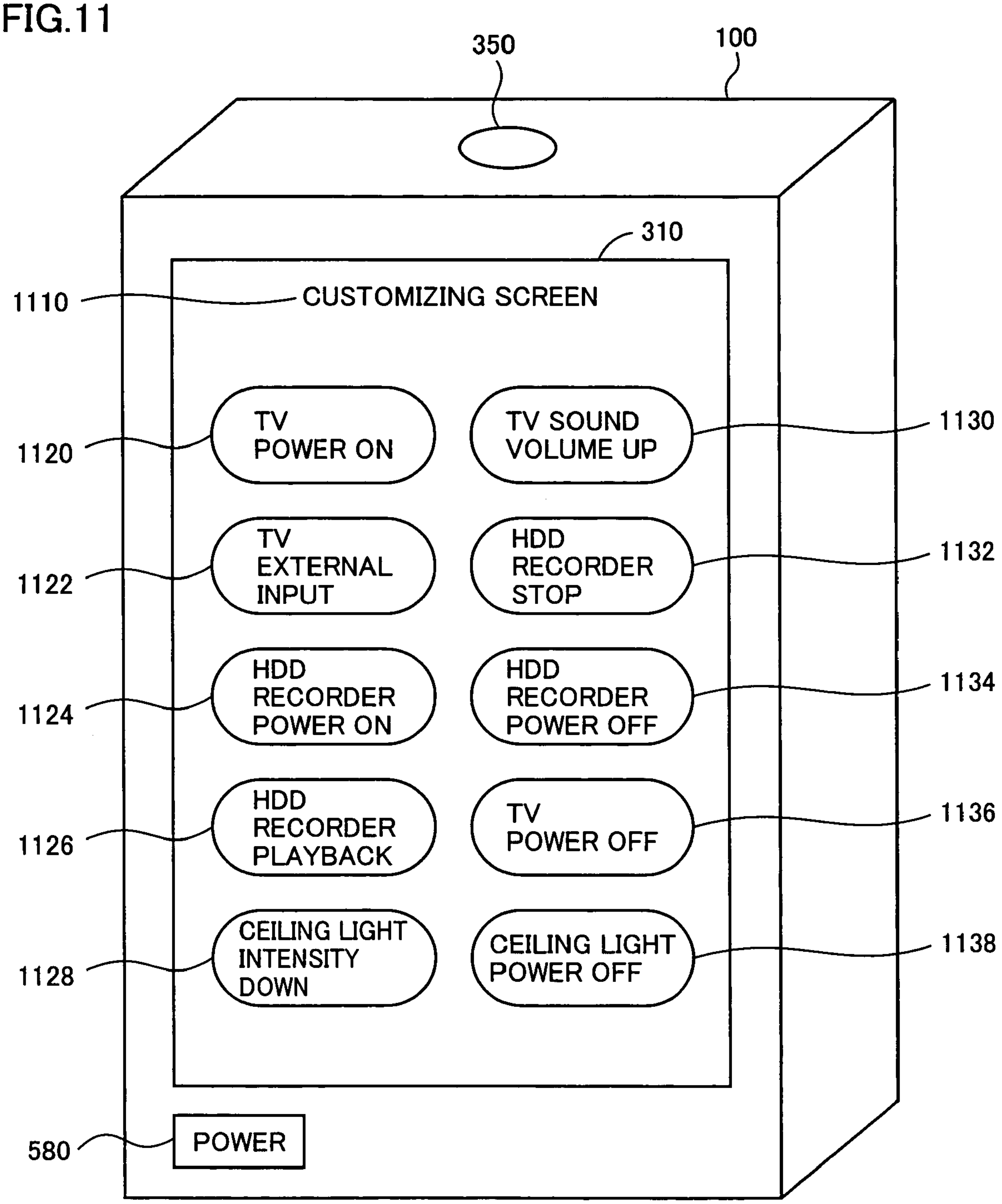
FIG. 11 is a diagram illustrating a form of a screen displayed by the touch panel.

Then, with reference to FIG. 11, a description will be given of a display mode of remote controller 100 having the settings done by the user. FIG. 11 is a diagram illustrating a form of a screen displayed by touch panel 310. Touch panel 310 displays a message 1110 indicating that the displayed screen has been set by the user and icons 1120 to 1138 based on the data shown in FIG. 10. For example, icon 1120 is the icon for accepting the instruction for turning on the power to television 20. That is to say, icon 1120 is implemented on the basis of the apparatus name "television" corresponding to No. "01" shown in FIG. 10 and the operation content (power on). Similarly, icon 1122 is displayed by the data related to No. "02" in FIG. 10. Icons 1124 to 1138 are displayed in a similar manner.

When the user presses, for example, icon 1124 on remote controller 100 shown in FIG. 11, remote controller 100 transmits the control signal for turning on the power to hard disk recorder 30. When the user presses icon 1126, hard disk 30 starts playback. After that, when the user presses icon 1128, remote controller 100 transmits the control signal to lower the intensity of ceiling light 50. As a result, the illumination of room 10 shown in FIG. 1 becomes dark. When the user presses icon 1130, television 20 outputs sound with an increased sound volume. In this manner, remote controller 100 accepts input of an operation for controlling each of a plurality of different apparatuses, and can transmit the control signal in accordance with the operation.

Figure 12:
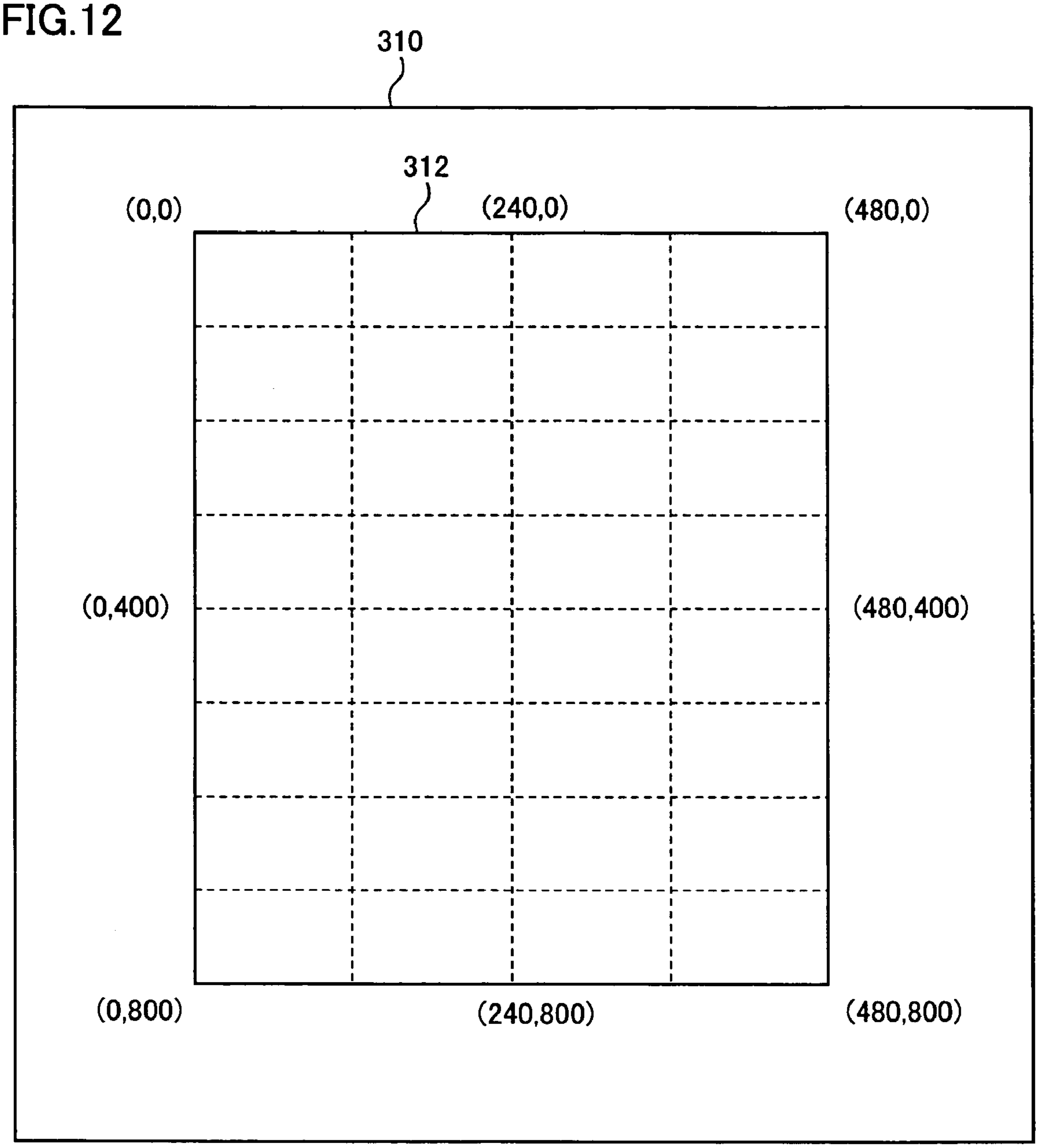
FIG. 12 is a diagram illustrating coordinates predefined in the display area of the touch panel.

Here, with reference to FIGS. 12 and 13, a description will be given of the display of icons on touch panel 310. FIG. 12 is a diagram illustrating coordinates predefined in display area 312 of touch panel 310. Display area 312 is defined, for example by the coordinates (0, 0) to the coordinates (480, 800). Such defined values are stored, for example, in the area reserved in screen display memory 342 in advance. Alternatively, the values may be stored in any one of the circuits in control circuit 320.

The size of the icons displayed on touch panel 310 may be changed on the basis of the data which indicates the size and is provided in advance. Alternatively, the user may select an area on touch panel 310, and the size may be changed in accordance with the selection result. For example, each small area produced by subdividing touch panel 310 in a matrix is made possible to be selected by the user in advance, and the same number of icons as the number of the small areas selected by the user are related to each other in order to display the icons representing the operation contents to be selected by the user. Thus, it is possible to display the icons having the size desired by the user on touch panel 310.

FIG. 13 is a diagram illustrating a form of data storage in setting-data memory 344. Setting-data memory 344 includes areas 1310 and 1320 for storing data. The data for identifying the icons is stored in area 1310. The position (for example, the center coordinates of an icon) at which the icon is displayed is stored in area 1320. Using such data, for example "1" is displayed at the position identified as the coordinates (120, 100) in display area 312. Also, "2" is displayed at the position identified as the coordinates (240, 100). Using such data, for example, remote controller 100 can display each of the number icons in the same array as a normal remote controller as shown in FIG. 7.

When the user of remote controller 100 inputs for changing the above-described coordinates, for example, an operation for selecting a new position, data indicating a new position, etc., the data stored in area 1320 is updated. Remote controller 100 displays each icon on the basis of the updated data. Thus, the user can change the positions of the icons displayed on remote controller 100.

Figure 14:
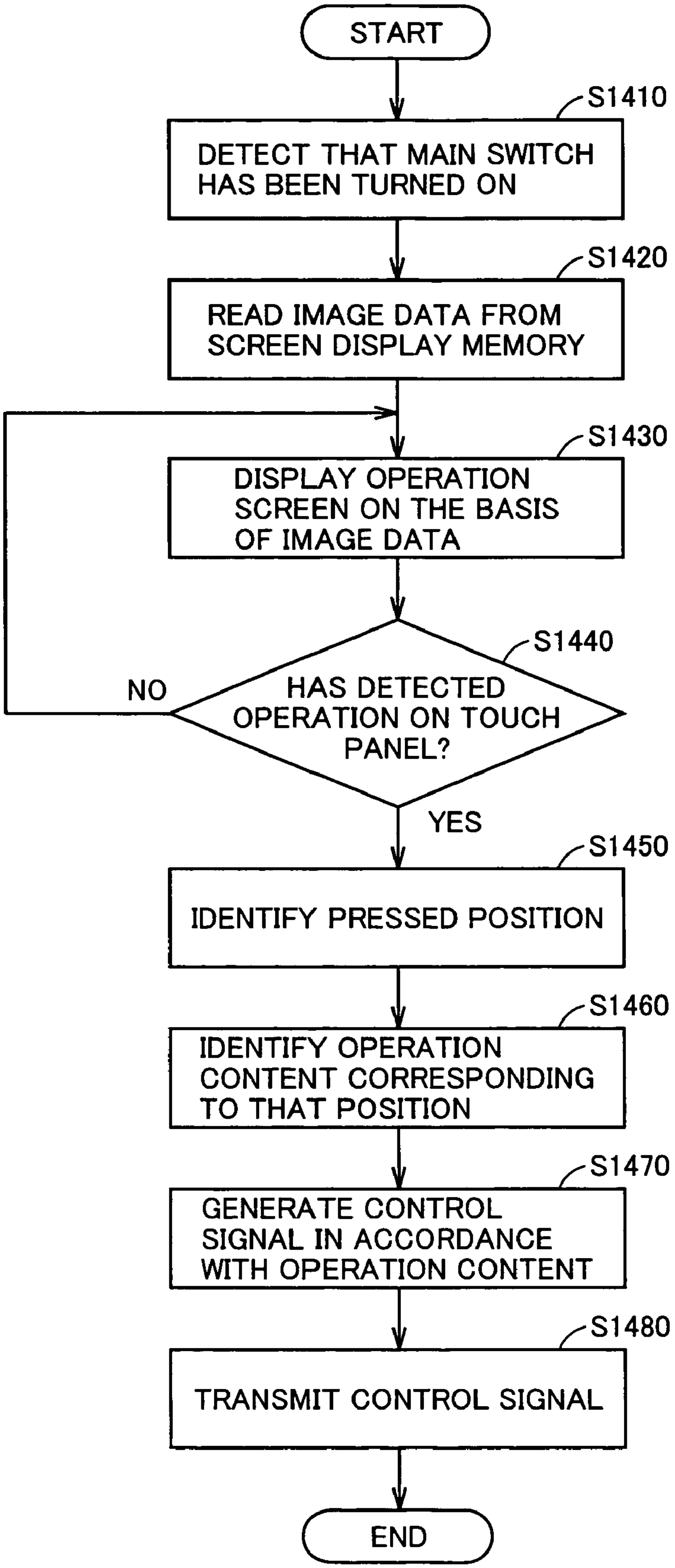
FIGS. 14 and 15 are flowcharts illustrating processing procedures executed by the control circuit.

With reference to FIG. 14, a further description will be given of the control structure of remote controller 100 according to the present embodiment. FIG. 14 is a flowchart illustrating a processing procedure executed by control circuit 320 in order for remote controller 100 to display the icons on the basis of the data set by the user.

In step S1410, control circuit 320 detects that power switch 580 has been turned on by the change of the voltage supplied from battery 360. In step S1420, screen-display control circuit 322 reads the data set by the user from setting-data memory 344. This data has a structure, for example as shown in FIG. 10. Screen-display control circuit 322 displays the operation screen on touch panel 310 on the basis of the data (FIG. 11).

In step S1440, instructed-operation detection circuit 326 determines whether an operation on touch panel 310 has been detected on the basis of the signal from pressed-area detection circuit 324. If instructed-operation detection circuit 326 has detected the operation (YES in step S1440), the control proceeds to step S1450. Otherwise (NO in step S1440), the control returns to step S1430.

In step S1450, instructed-operation detection circuit 326 identifies the pressed position on touch panel 310 on the basis of the signal from pressed-area detection circuit 324. In step S1460, instructed-operation detection circuit 326 further identifies the operation content corresponding to the position identified in step S1450. This identification is carried out, for example, on the basis of the position data indicating the pressed position and the data (area 1030) stored in setting data memory 344. In step S1470, control-signal generation circuit 330 generates the control signal corresponding to the identified operation content in step S1460 using control data stored in control data memory 346. In step S1480, control circuit 320 transmits the control signal through infrared transmission unit 350. Thus, remote controller 100 can function as a remote controller for causing a specific apparatus to execute the selected operation.

As described above, by remote controller 100 according to the present embodiment, setting data memory 344 stores the operation content for controlling the operation of the apparatus, which has been input by the user of remote controller 100 through touch panel 310. The operation content has been selected by the user. Remote controller 100 outputs the coded text signal corresponding to the selected operation content on the basis of the data stored in setting data memory 344. Thus, remote controller 100 can function as a remote controller customized by the user.

First Modification

In the following, a description will be given of a modification of remote controller 100 according to a first modification of the present embodiment. Remote controller 100 according to this modification is different from the remote controller of the above-described embodiment in the point of having a function that the icons displayed on touch panel 310 are changed in accordance with the history of the operations. In this regard, remote controller 100 according to this modification is implemented, for example, using the hardware configuration of remote controller 100 shown in FIG. 3. Accordingly, the following description will be given using the configuration shown in FIG. 3.

Figure 15:
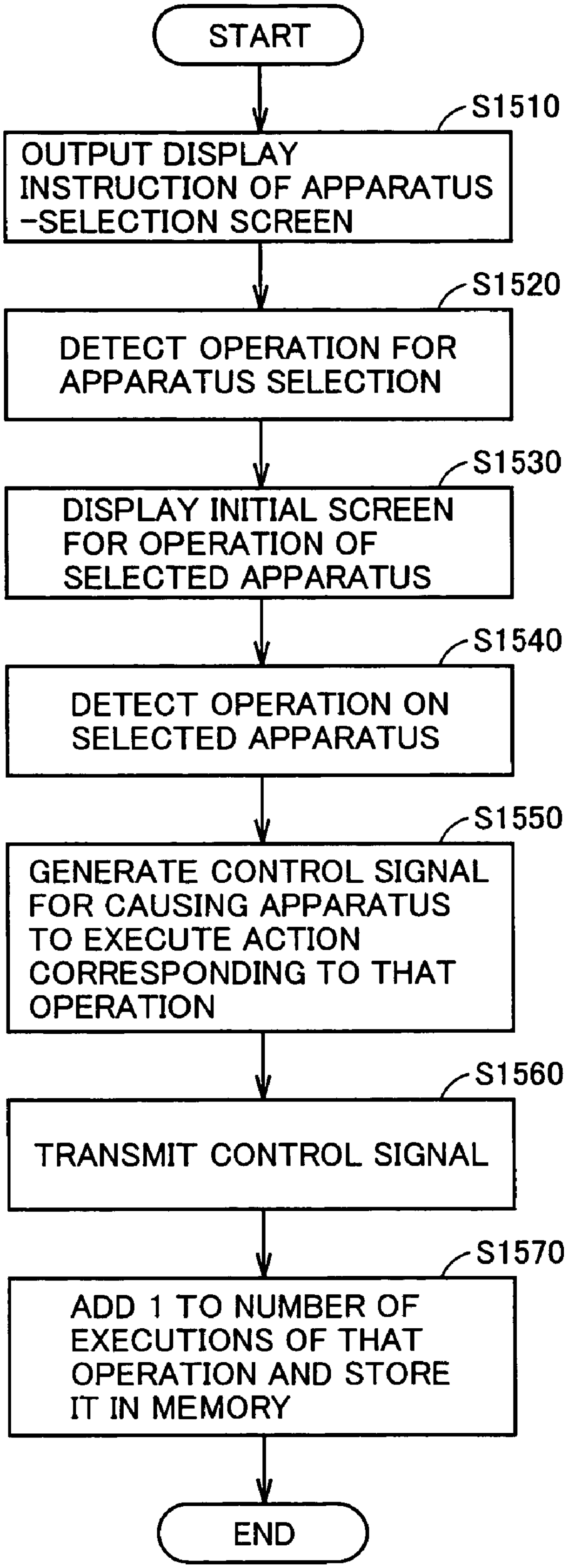

FIG. 15 is a flowchart illustrating a processing procedure executed by control circuit 320 in order to record the history of the operations on remote controller 100.

In step S1510, control circuit 320 outputs a display instruction of the selection screen of the apparatus on the basis of the operation on touch panel 310. Screen-display control circuit 322 displays that selection screen on touch panel 310 using the data stored in screen display memory 342 in response to that instruction. In step S1520, control circuit 320 detects the operation for selection of the apparatus on the basis of the operation on touch panel 310. Specifically, pressed-area detection circuit 324 detects that the icon of a specific apparatus has been pressed among each of the icons shown in FIG. 5.

In step S1530, control circuit 320 displays the initial screen (for example, the screen shown in FIG. 7 or FIG. 8) for the operation of the selected apparatus. When such a display is performed, remote controller 100 functions as a remote controller for controlling the specific apparatus.

In step S1540, control circuit 320 detects that an operation on the apparatus selected on the basis of the operation on touch panel 310. Specifically, pressed-area detection circuit 324 obtains the data indicating the pressed area in display area 312 of touch panel 310. Instructed-operation detection circuit 326 detects which operation is performed, that is to say, the operation content on the basis of the position and the control data corresponding to that position.

In step S1550, control circuit 320 generates the control signal for performing the operation corresponding to the apparatus on the basis of the data stored in control data memory 346. Specifically, control-signal generation circuit 330 reads the control data from control data memory 346 and combines the control data with the data for identifying the apparatus using that control data to generate the control signal. In step S1560, control circuit 320 transmits the control signal through infrared transmission unit 350. In step S1570, control-signal generation circuit 330 updates the number of times by adding "1" to the number of times of the executed operation for the data for identifying the used control data, and stores the number of times after the update in control data memory 346. The area for storing that data is the area reserved in advance as the area for storing the operation history. In this manner, the history of the operation on remote controller 100 is obtained, and is saved as the data.

Then, with reference to FIG. 16, a description will be given of data structure of remote controller 100 according to the present modification. FIG. 16 is a diagram illustrating a form of the storage of the operation history store in setting-data memory 344. Setting-data memory 344 includes areas 1610 to 1640 for storing the data.

The data for identifying each operation of each apparatus is stored in area 1610. The data (for example, the apparatus's name) for identifying an apparatus is stored in area 1620. The data for identifying the icon that has been operated for the apparatus is stored in area 1630. The number of times of the operation is stored in area 1644. For example, the number of times Channel 2 of television 20 has been selected is 10. Also, the number of times Channel 4 of television 20 has been selected is 50. In this manner, the history of each operation for each apparatus is generated.

In this regard, it is possible to change the icons displayed on remote controller 100 on the basis of the above-described operation history. For example, it is possible to display only the icons that are frequently used on the initial screen of touch panel 310. Alternatively, it is possible to display the icons that has been operated more times than a preset number of times larger in size. Also, the opposite is also possible. In this manner, the icons are displayed according to their frequencies of use. It is also possible not to display the icons that are not used.

Figure 17:
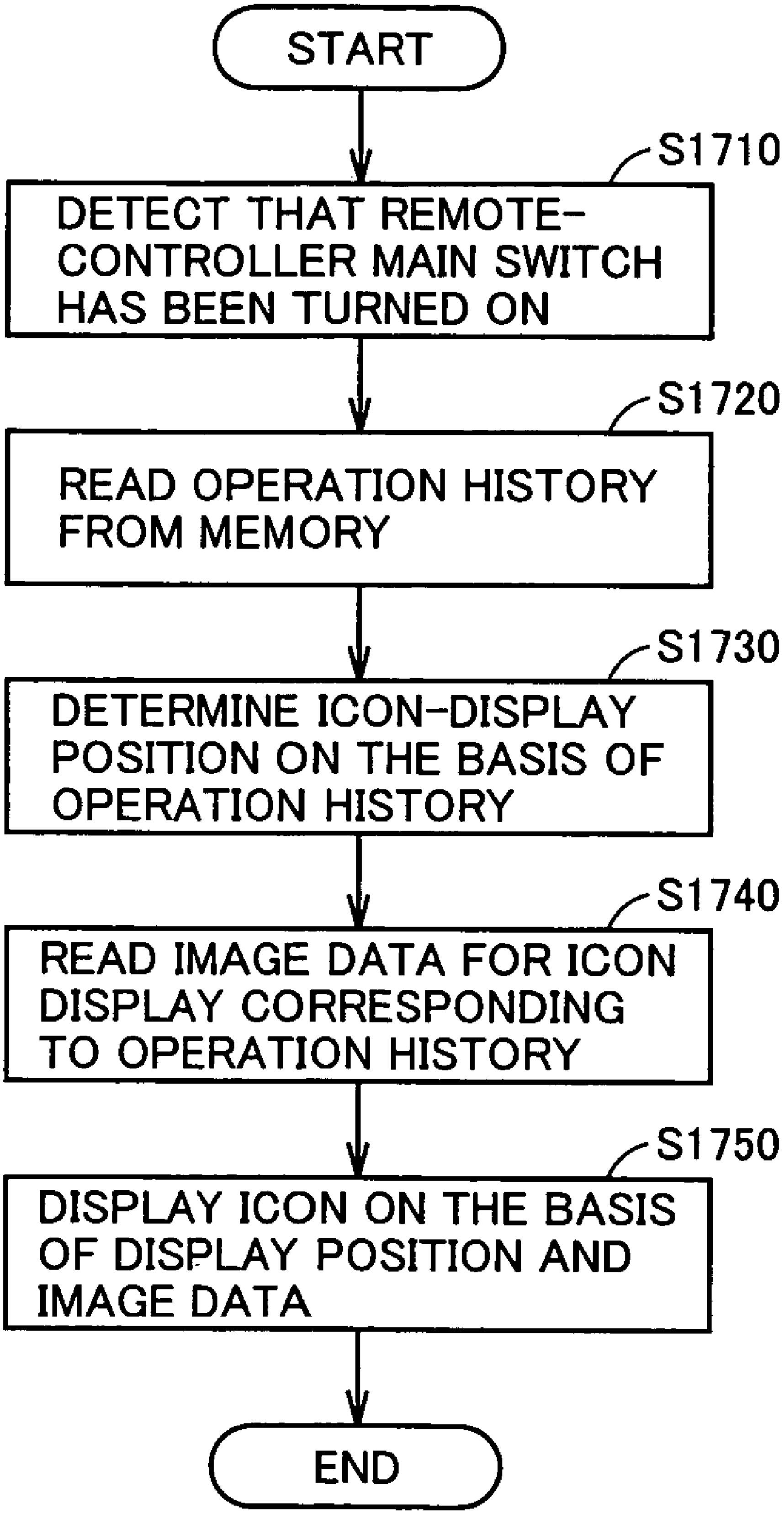
FIG. 17 is a flowchart illustrating a processing procedure executed by the control circuit for changing icon display forms on the basis of the operation history.

Then, with reference to FIG. 17, a description will be given of the control structure of another aspect of remote controller 100 according to the present modification. FIG. 17 is a flowchart illustrating a processing procedure executed by control circuit 320 for changing icon display forms on the basis of the operation history.

In step S1710, control circuit 320 detects that power switch 580 has been turned on. In step S1720, display-data generation circuit 328 reads the operation history (FIG. 16) from setting data memory 344. In step S1730, display-data generation circuit 328 determines the display position of the icon to be displayed on touch panel 310 on the basis of the operation history. Display-data generation circuit 328 determines, for example, the display position of only the icons having the numbers corresponding to the individual up-to-now operations, which are larger than preset upper limit values.

In step S1740, display-data generation circuit 328 reads the image data for displaying the icons corresponding to the operation history from setting data memory 344. In step S1750, display-data generation circuit 328 generates the display data of the icons to be displayed on touch panel 310 on the basis of the display position and the image data. The display data is written into screen display memory 342. When screen-display control circuit 322 reads that data, touch panel 310 displays the icons in a mode in which the operation history is reflected.

Figure 18:
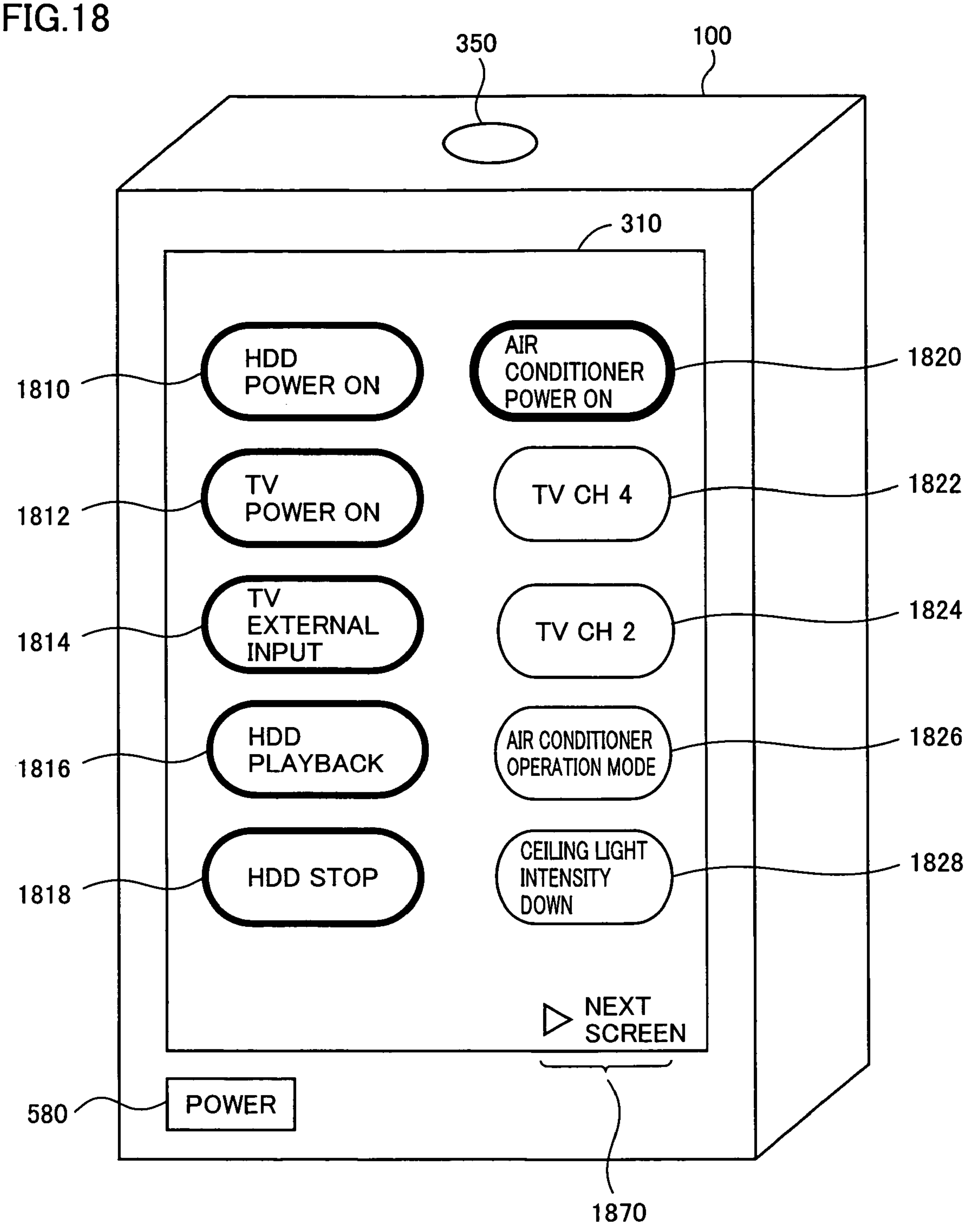
FIG. 18 is a diagram illustrating a display screen of icons when an operation history is reflected.

Next, with reference to FIG. 18, a description will be given of the display mode of the screen in the remote controller 100. FIG. 18 is a diagram illustrating a display screen of icons when an operation history is reflected. Touch panel 310 displays icons 1810 to 1828 and an icon 1870. Here, size of icons 1810 to 1820 and the size of icons 1822 to 1828 are different. That is to say, the reference to the operation history shows that the number of the operations corresponding to icons 1810 to 1820 are greater than the preset upper limit values (for example, 100 times), and thus each of the icons is displayed larger in size than usual icons. In contrast, the operations corresponding to icons 1822 to 1828 have the number of operation times smaller than those upper limit values, and thus those icons are displayed smaller in size than each of the above-described icons.

As described above, remote controller 100 according to the present modification changes the sizes of the icons in accordance with the number of operation times. For example, in remote controller 100, the icons corresponding to frequently used operations are displayed large in size. Accordingly, in touch-panel remote controller 100, it is possible to prevent not-frequently-used icons to be selected, and at the same time, to make the selection of frequently-used icons easy.

In this regard, in the above-described modification, the number of operation times is used. However, another history may be used. For example, the display of icons may be changed on the basis of the order of the operations. Specifically, every time an operation is performed, the number representing the operation content is saved in sequence, and a preset number of operation contents are identified from the last operation content by referring to the numbers. Then, the size of the icon corresponding to the identified operation content may be displayed larger than the icons corresponding to the other operation contents. In this manner, recently used icons are displayed differently from the icons corresponding to the other operation contents. In this manner, it is possible to prevent inexperienced users from making operation errors, and thus it is possible to provide a remote controller which is easy to use and more convenient.

Second Modification

Next, a description will be given of a second modification of the present embodiment. In the above-described embodiment and the modification thereof, a change of the screens displayed on touch panel 310 has not been described. Thus, a description will be given of a mode of changing the screens for giving instructions to the apparatus.

FIG. 19 is a diagram illustrating a form of data storage in setting-data memory 344. Setting-data memory 344 includes tables 1910 and 1920 which store data for defining the screens to be displayed on touch panel 310. Table 1910 includes areas 1912 to 1916 for storing data. Table 1920 includes the same areas 1922 to 1926.

Area 1912 includes the data for identifying, for example, a screen. Area 1914 includes the data for identifying an apparatus. Area 1916 includes an icon for identifying an operation corresponding to that apparatus. This is the same for the data storage in table 1920. In this manner, it is possible to change screens displayed on touch panel 310 by setting data memory 344 having a plurality of tables. For example, a first screen and a second screen can be displayed interchangeably by using tables 1910 and 1920.

Figure 20:
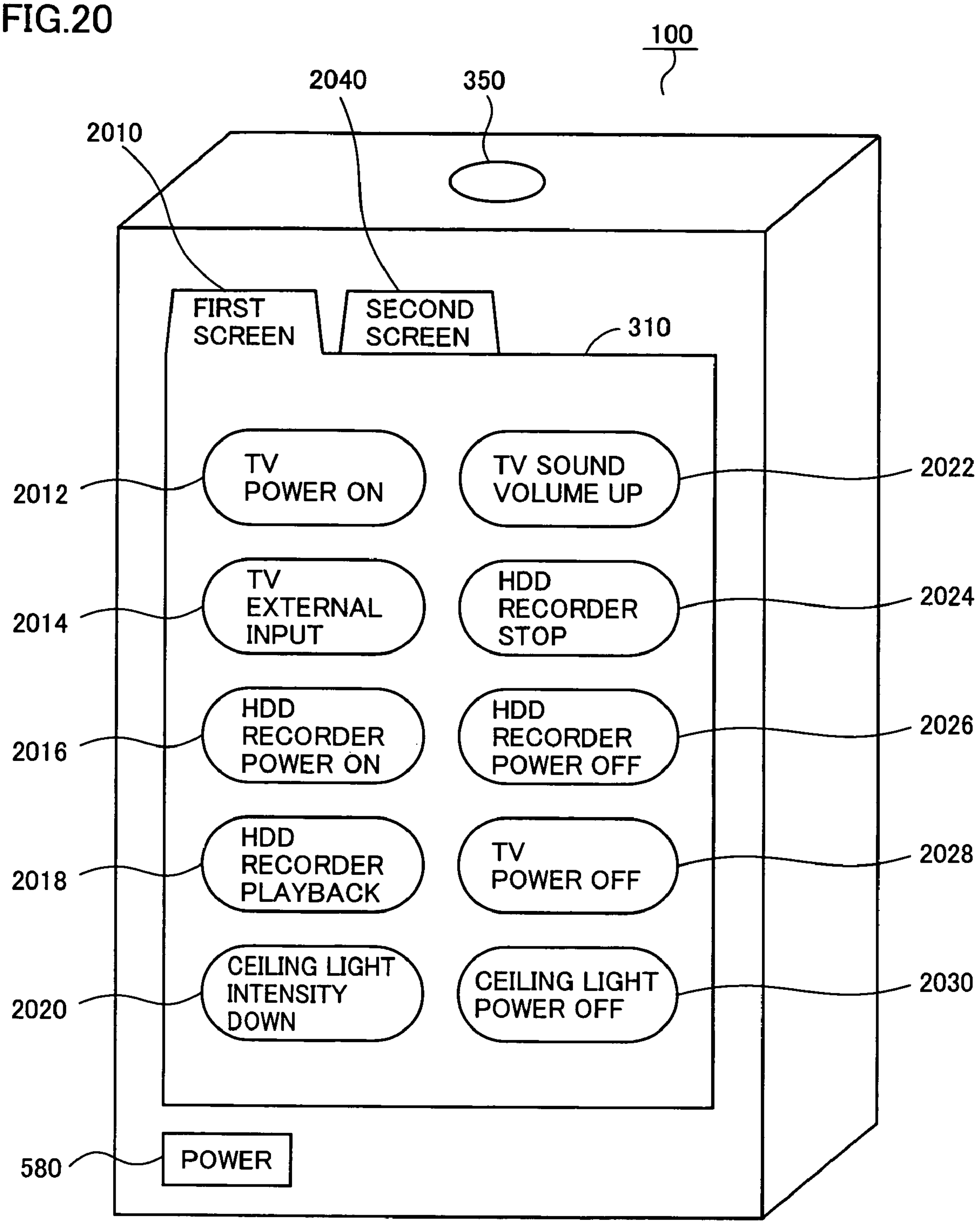
FIGS. 20 and 21 are diagrams illustrating forms of screens displayed on the remote controller according to the second modification of the embodiment of the present invention.
Figure 21:
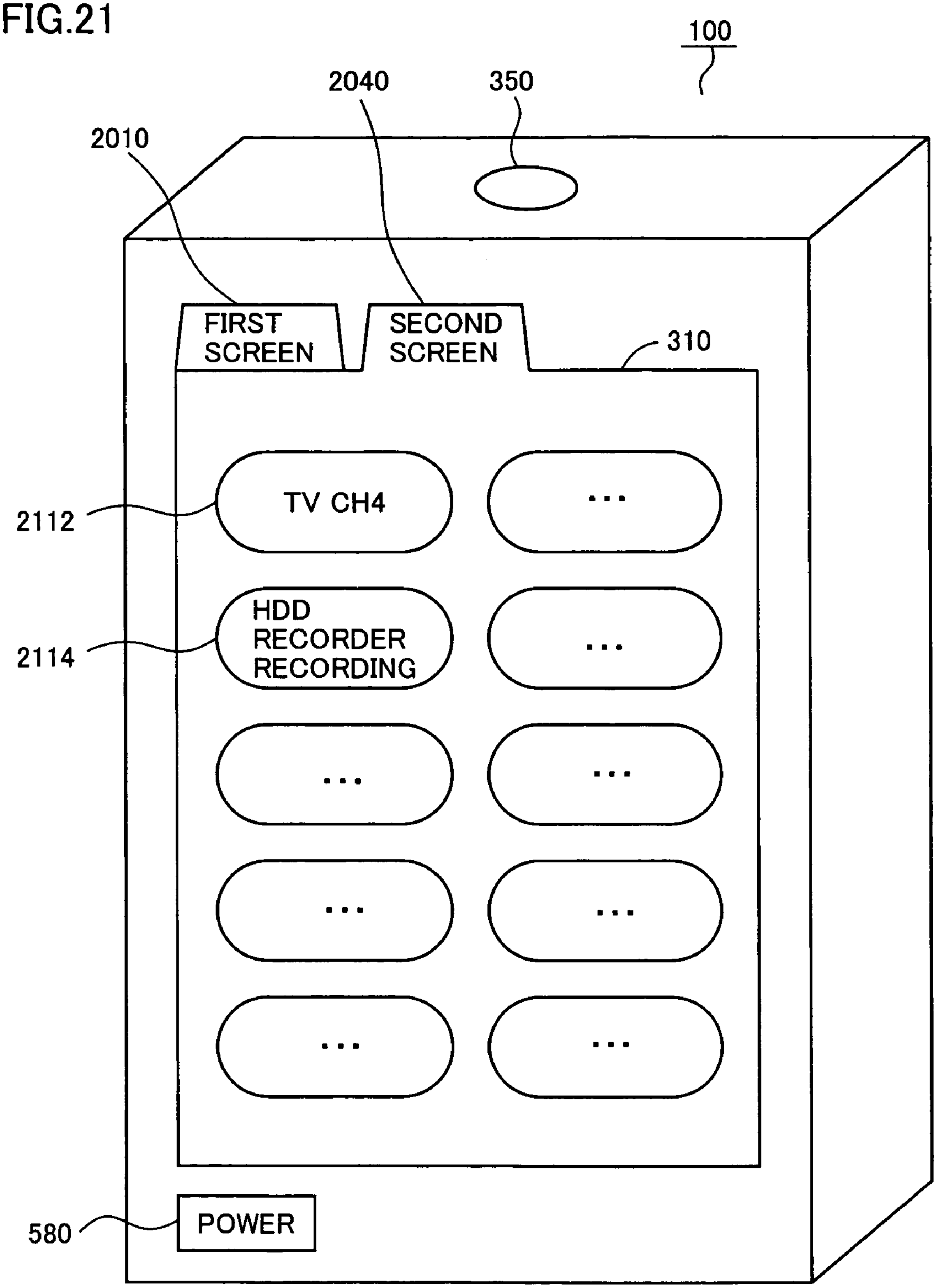

Then, with reference to FIGS. 20 and 21, a description will be given of display modes of remote controller 100 on the basis of such data. FIG. 20 and FIG. 21 are diagrams illustrating individual forms of screens displayed on remote controller 100.

As shown in FIG. 20, touch panel 310 displays a first screen 2010 and a second screen 2040. The display is changed on the basis of the operation on a specific area (for example, an area of an image so-called a "tab"). First screen 2010 includes icons 2012 to 2030. Each of the icons is displayed on the basis of the data stored in table 1910 (FIG. 19). In this display, touch panel 310 displays second screen 2040 by the user of remote controller 100 carrying out the operation (for example, a touch operation on the area which is displayed as "second screen") for selecting second screen 2040. In this case, second screen 2040 displays each of the icons based on the data stored in table 1920 in place of icons 2012 to 2030 shown in FIG. 20.

That is to say, remote controller 100 displays second screen 2040 as shown in FIG. 21. Second screen 2040 includes, for example, an icon 2112 for accepting the operation to instruct the television to select Channel 4, an icon 2114 for accepting the operation to cause the HDD recorder to perform the recording operation, etc. Also, the user is allowed to cause HDD recorder 30 to perform the video/audio recording. After that, if the user touches an area displayed as "first screen", remote controller 100 displays first screen 2010 once again.

As described above, by remote controller 100 according to the present modification, a plurality of screens on which the icons corresponding to the operation contents are generated on the basis of the history of the operation content. The screen displayed as an initial screen at the time of starting remote controller 100 displays, for example the icons corresponding to the frequently-used operation contents. On the other screens, the icons corresponding to not-frequently-used operation contents are displayed. The icon displayed on these screens may be one, or may be plural. Each of the icons is related to the control data in order for the instructions for executing the displayed operation contents to be output.

In this manner, it is possible for the user of remote controller 100 to find the operation contents easily, because the icons corresponding to the frequently-used operation contents are displayed. Also, operation errors are prevented. Thus, the user-friendliness of remote controller 100 is improved.

In this regard, in this modification, a description has been given of the case in which the icons displayed on each screen are selected in accordance with the operation history of the icons. However, the selection of the icons are not necessarily based on the operation history. That is to say, the screen to be displayed can be set by the selection operation by the user of remote controller 100. For example, the user may select the icons that the user needs to display on the initial screen, may relate the data indicating the initial screen with the selected icon, and may input the instruction to save the result of the relation in a memory. In this manner, the display of the icons in accordance with the operation pattern of a specific user is achieved before the generation of the operation history. Thus, it is possible to increase convenience more easily.

Also, the target to which the above-described technical idea is applied is not limited to remote controller 100 of the above-described touch panel type. For example, the technical idea may be applied to a terminal having a display unit displaying an image and a plurality of operation buttons, such as a cellular phone. The terminal may be, for example, an existing remote controller for controlling a television, etc.

Figure 22:
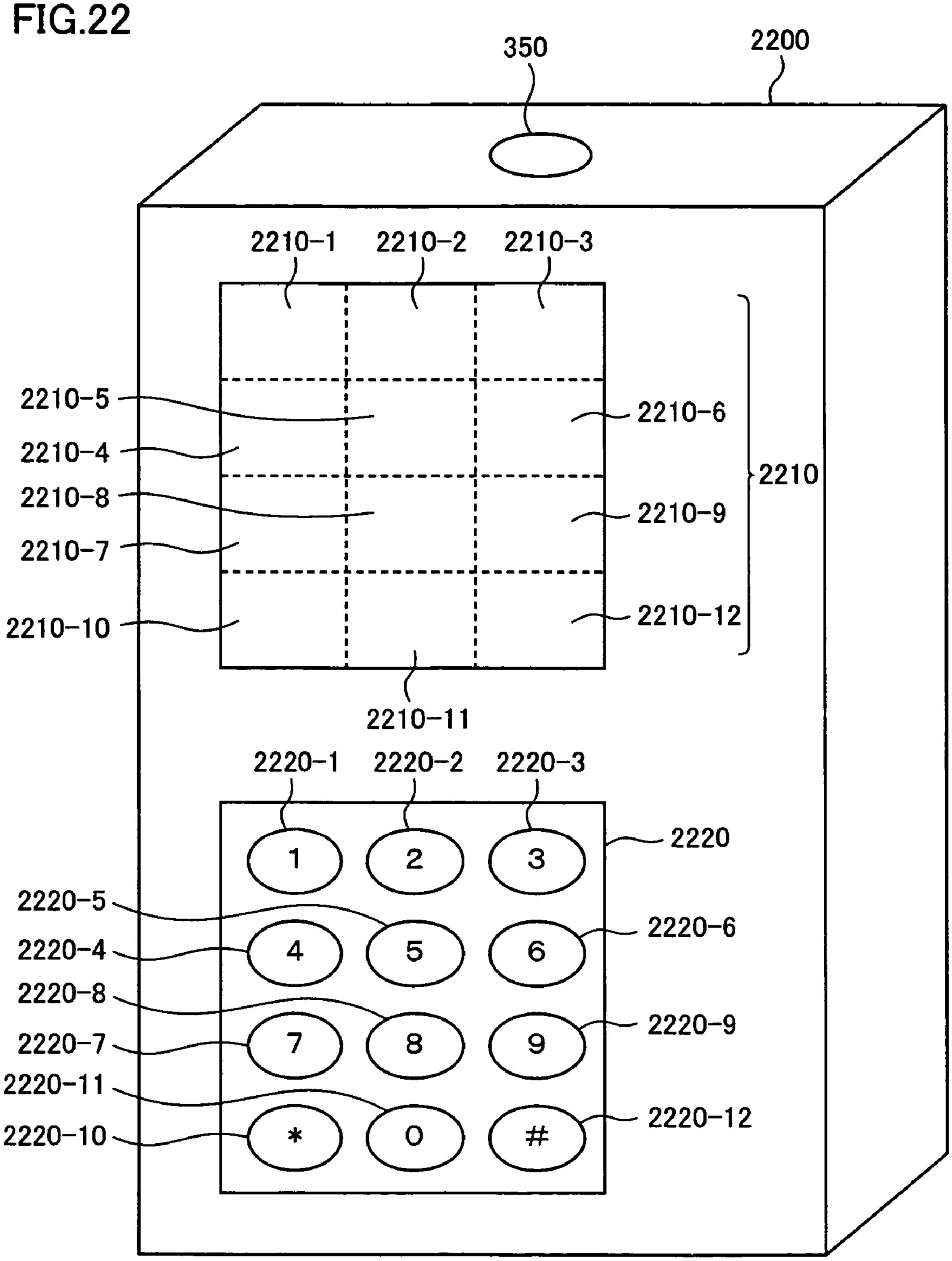
FIGS. 22 and 23 are outer views illustrating a remote controller according to another aspect of the present invention.
Figure 23:
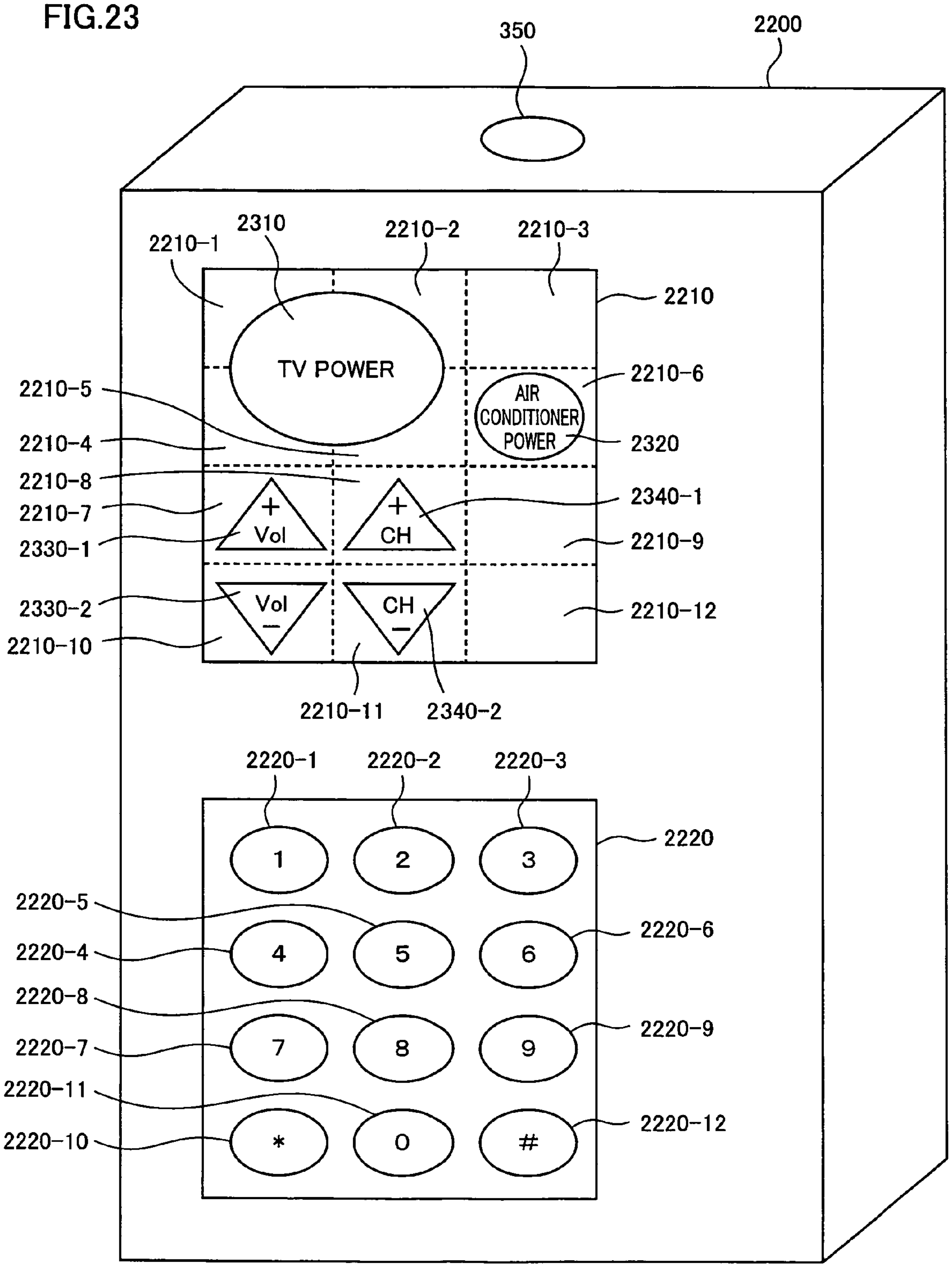

Then, with reference to FIGS. 22 and 23, a description will be given of a remote controller 2200 according to another aspect of the present invention. FIGS. 22 and 23 are outer views each illustrating remote controller 2200.

As shown in FIG. 22, remote controller 2200 includes a display unit 2210 displaying an image and a plurality of buttons 2220 accepting instruction input. The display area of display unit 2210 is subdivided into sub-areas 2210-1 to 2210-12. In this regard, the broken lines shown in FIG. 22 indicate individual sub-areas for differentiation and are not necessarily displayed in order to differentiate each sub-area. In this regard, the differentiation of each sub-area is achieved, for example by regarding the display area of the display unit 2210 as an X-Y coordinate plane, and relating each sub-area to (x-coordinate values and y-coordinate values). The display unit 2210 is implemented, for example by a liquid-crystal display unit or an EL (Electro Luminescence) display.

A plurality of the buttons 2220 include individual buttons 2220-1 to 2220-12 representing numeric buttons and symbol buttons. The other display buttons may be included. Each of buttons 2220-1 to 2220-12 are individually related to sub-areas 2210-1 to 2210-12. These relationships are implemented by storing the area-identification data for identifying sub-areas 2210-1 to 2210-12 and the button-identification data for identifying buttons 2220-1 to 2220-12 in a memory (not shown) included in remote controller 2200 in connection with each other. In this case, when any one of buttons 2220-1 to 2220-12 is identified, the sub-area corresponding to the identified button is identified.

For example, button 2220-1 marked with the number "1" is corresponded to sub-area 2210-1. In this case, when button 2220-1 is pressed by the user of remote controller 2200, the pressing is recognized as the instruction on the content displayed in sub-area 2210-1. The control unit (for example, corresponding to controller 220 of remote controller 100) of remote controller 2200 generates the control signal for implementing the function corresponding to sub-area 2210-1, and transmits it as an infrared signal to the outside of remote controller 2200.

With reference to FIG. 23, a specific description will be given of the case where remote controller 2200 turning on/off the power to the television, turning on/off the power to the air conditioner, turning up/down the sound volume of the television, and selecting the channel upward/downward.

Remote controller 2200 individually displays icons 2310, 2320, 2330-1, 2330-2, 2340-1, and 2340-2 in display unit 2210. Icon 2310 is displayed in order to accept the instruction to turn on/off the power to the television. Icon 2320 is displayed in order to accept the instruction to turn on/off the power to the air conditioner. Icons 2330-1 and 2330-2 are displayed in order to accept the instruction to instruct the television to turn up/down the sound volume. Icons 2340-1 and 2340-2 are displayed in order to accept the instruction to instruct the television to select a channel upward/downward.

Sub-area 2210-1, 2210-2, 2210-4, and 2210-5 are individually related to buttons 2220-1, 2220-2, 2220-4, and 2220-5. Accordingly, when each of the buttons marked with the numbers "1", "2", "4", and "5" is pressed, the controller of remote controller 2200 recognizes the pressing as the instruction to turn on/off the power to the television. When any button is pressed, the controller transmits the control signal for giving the instruction through infrared transmission unit 350. When the television receives the control signal, the power is turned on/off in accordance with the signal.

Sub-area 2210-6 is related to button 2220-6. Accordingly, when the button marked with the number "6" is pressed, the controller recognizes the pressing as the instruction to turn on/off the power to the air conditioner. The controller generates the control signal for giving the instruction, and transmits the signal through infrared transmission unit 350. When the air conditioner receives the signal, the power is turned on/off in response to the signal.

Alternatively, when button 2220-7 is pressed, the control signal for instructing the television to increase the sound volume is transmitted from infrared transmission unit 350. As a result, the sound volume of the television is turned up. In contrast, when button 2220-8 is pressed, the sound volume of the television is turned down. When buttons 2220-8 or 2200-11 is pressed, the control signal is transmitted in the same manner, and the channel of the television is selected upward or downward.

In this manner, a casing provided with a plurality of operation units, such as a plurality of buttons and a display unit can function as a remote controller for controlling a plurality of apparatuses. Also, it is possible to change the number of the buttons corresponding to an icon in response to a function, for example the size of icon 2310 and the size of icon 2320 are different. For example, many buttons may be related to a function which is frequently used.

Specifically, four buttons 2220-1, 2220-2, 2220-4, and 2220-5 correspond to the power switch of the television, which is displayed as icon 2310. Accordingly, the user can turn on/off the power to the television by pressing any one of the buttons, and thus the user-friendliness can be improved.

Also, each button has a three-dimensional shape, and thus the user can operate remote controller 2200 by a touch using a finger tip without always viewing the controller. For example, buttons 2220-5 is provided with a projecting portion. By the controller displaying an image of the projecting portion in sub-area 2210-5 of display unit 2210, it is possible for the user to operate remote controller 2200 to give an instruction to each apparatus only by the operation of the button without directly viewing remote controller 2200. In this manner, the user-friendliness of remote controller 2200 can also be improved.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A remote controller comprising:

an operation unit displaying an image in a display area and accepting an operation on the image;

a first storage unit storing each identification data for identifying each of a plurality of apparatuses, each control data for executing each of a plurality of predefined operations for each of a plurality of the apparatuses, and each image data representing an image identifying each of the operations;

a first display control unit displaying a plurality of images in the display area on the basis of an operation on the operation unit and each of the image data;

a change unit changing the image displayed in the display area on the basis of the operation for the operation unit;

a second storage unit storing change data indicating the target of the change on the image having been changed;

a second display control unit displaying the image having been changed in the display area on the basis of the change data;

a generation unit generating a control signal for instructing execution of the operation corresponding to the image having received the operation on the basis of the operation on the image displayed in the display area and having been changed using the control data corresponding to the image having received the operation; and a transmission unit transmitting the control signal.

2. The remote controller according to claim 1, wherein the operation unit includes a touch panel displaying an image in the display area, accepting the operation on the image, and outputting a signal corresponding to the operation.

3. The remote controller according to claim 1, wherein the change unit includes a detection unit detecting a selection of an image displayed in the display area on the basis of the operation on the operation unit and an acceptance unit accepting input of position data for determining a position in the display area of the selection detected image, and the second storage unit stores the position data and image identification data indicating the selection of the image, and the second display control unit displays the selected image in the display area on the basis of the position data and the image identification data.

4. The remote controller according to claim 1, wherein the transmission unit includes an infrared transmission unit transmitting the control signal as an infrared signal.

5. The remote controller according to claim 1, wherein the change unit includes a size-change unit changing the size of a plurality of the images displayed in the display area on the basis of the operation on the operation unit.

6. The remote controller according to claim 5, wherein the operation unit accepts input of size-change data for changing the size of a plurality of the images, and the size-change unit changes the size on the basis of the size-change data.

7. The remote controller according to claim 5, further comprising a history storage unit storing a history of the operation on the operation unit, wherein the size-change unit changes the size on the basis of the operation history.

8. The remote controller according to claim 7, wherein the size-change unit changes the size of an image having accepted a number of operations exceeding a preset number.

9. The remote controller according to claim 7, wherein the size-change unit calculates an order of a history of the operation on each of the images, and enlarges the size of an image having an order included in a preset order larger than the size of an image having an order not included in the preset order.

10. The remote controller according to claim 1, wherein the change unit includes a position-change unit changing the positions of a plurality of the images displayed in the display area on the basis of the operation on the operation unit.

11. The remote controller according to claim 10, wherein the operation unit accepts input of data for identifying a display position of each of a plurality of the images, and the position-change unit changes the position of the image on the basis of the data for identifying the position.

12. The remote controller according to claim 10, further comprising a history storage unit storing a history of the operation on the operation unit, wherein the position-change unit changes the position on the basis of the operation history.

13. The remote controller according to claim 12, wherein the position-change unit changes the position of an image having accepted a number of operations exceeding a preset number to an upper position than the position of an image having accepted a number of operations falling below the number.

14. The remote controller according to claim 12, wherein the position-change unit calculates an order of a history of the operation on each of the images, and changes a screen displaying an image having an order included in a preset order to a screen displaying an image having an order not included in the preset order.

15. The remote controller according to claim 14, wherein the position-change unit displays, in the display area, only an image having an order included in the preset order.

16. The remote controller according to claim 14, wherein the position-change unit further includes a prohibiting unit prohibiting the display of an image of the position having an order not included in the preset order.

17. A remote controller comprising:

an operation unit displaying an image in a display area and accepting an operation on the image;

a memory storing each identification data for identifying each of a plurality of apparatuses, each control data for executing a plurality of predefined operations for each of a plurality of the apparatuses, each image data representing an image identifying each of the operations, and an instruction sequence; and a processor executing the instruction sequence, wherein the instruction sequence includes a first display control step of displaying a plurality of images in the display area on the basis of an operation on the operation unit and each of the image data, a change step of changing the image displayed in the display area on the basis of the operation on the operation unit, a step of generating change data indicating the target of the change on the image having the change, a second display control step of displaying an image having the change in the display area, a generation step of generating a control signal for instructing execution of the operation corresponding to the image having received the operation on the basis of the operation on the image having the change displayed in the display area using the control data corresponding to the image having received the operation; and a step of instructing transmission of the control signal.

18. The remote controller according to claim 17, wherein the change step includes a detection step of detecting a selection of an image displayed in the display area on the basis of the operation on the operation unit and a step of accepting input of position data for determining a position in the display area of the selection detected image, the step of generating the change data generates the position data and image identification data indicating selection of the image, and the second display control step displays the selected image in the display area on the basis of the position data and the image identification data.

19. The remote controller according to claim 17, wherein the change step includes a step of changing the size of a plurality of the images displayed in the display area on the basis of the operation on the operation unit.

20. The remote controller according to claim 19, wherein the operation unit accepts input of size-change data for changing the size of a plurality of the images, and the size-change step changes the size on the basis of the size-change data.

* * * * *